United States Patent
Yao et al.

(10) Patent No.: US 11,318,471 B2
(45) Date of Patent: May 3, 2022

(54) METHOD AND SYSTEM FOR OPTOFLUIDIC STRETCHING OF BIOLOGICAL CELLS AND SOFT PARTICLES

(71) Applicant: The Hong Kong University of Science and Technology, Hong Kong (CN)

(72) Inventors: Zhanshi Yao, Hong Kong (CN); Ching Chi Kwan, Hong Kong (CN); Andrew Wing-On Poon, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 284 days.

(21) Appl. No.: 16/741,488

(22) Filed: Jan. 13, 2020

(65) Prior Publication Data

US 2020/0230602 A1     Jul. 23, 2020

Related U.S. Application Data

(60) Provisional application No. 62/954,047, filed on Dec. 27, 2019, provisional application No. 62/918,234, filed on Jan. 23, 2019.

(51) Int. Cl.
*B01L 3/00* (2006.01)
*G01N 15/14* (2006.01)

(52) U.S. Cl.
CPC ..... *B01L 3/502761* (2013.01); *B01L 3/50273* (2013.01); *B01L 3/502715* (2013.01);
(Continued)

(58) Field of Classification Search
CPC ..... B01L 2200/0663; B01L 2200/0668; B01L 2300/06; B01L 2300/12; B01L 2400/0454; B01L 2400/0475; B01L 2400/0487; B01L 3/502715; B01L 3/50273; B01L 3/502761; G01N 15/1434; G01N 15/1475;
(Continued)

(56) References Cited

U.S. PATENT DOCUMENTS 6,067,859 A    5/2000   Käs et al.
7,460,240 B2  12/2008   Akcakir
(Continued)

FOREIGN PATENT DOCUMENTS

WO    WO-0244689 A2 *   6/2002    ............... H05H 3/04
WO    WO-2012092545 A1 *  7/2012  ........ B01L 3/502761

OTHER PUBLICATIONS

Bao, et al., "*Cell and molecular mechanics of biological materials*", *Nature Materials*, vol. 2, pp. 715-725, (Nov. 2003).
(Continued)

*Primary Examiner* — Jennifer Wecker
(74) *Attorney, Agent, or Firm* — Leydig, Voit & Mayer, Ltd

(57) ABSTRACT

A method for stretching a plurality of sample isolates, including: trapping the plurality of sample isolates away from a wall of at least one microfluidic channel of a microfluidic flow system; generating a microfluidic flow to stretch the plurality of trapped sample isolates; determining deformation characteristics of the plurality of stretched samples isolates based on one or more frames from an image processing system; and outputting information corresponding to the deformation characteristics.

20 Claims, 23 Drawing Sheets

(52) U.S. Cl.
CPC ..... *G01N 15/1434* (2013.01); *G01N 15/1484* (2013.01); *B01L 2200/0663* (2013.01); *B01L 2300/06* (2013.01); *B01L 2300/12* (2013.01); *B01L 2400/0475* (2013.01)

(58) Field of Classification Search
CPC ....... G01N 15/1484; G01N 2015/1006; G01N 2015/1075; G01N 2015/1493; G01N 2015/1495
See application file for complete search history.

(56) References Cited

U.S. PATENT DOCUMENTS

| | | | |
|---|---|---|---|
| 8,119,976 | B2 | 2/2012 | Squier et al. |
| 8,149,416 | B2 | 4/2012 | Akcakir |
| 8,571,365 | B2 | 10/2013 | Mohanty et al. |
| 8,635,911 | B2 | 1/2014 | Son et al. |
| 8,935,098 | B2 | 1/2015 | Di Carlo et al. |
| 9,897,532 | B2 | 2/2018 | Di Carlo et al. |
| 2007/0008528 | A1 | 1/2007 | Chiou et al. |
| 2008/0310009 | A1 | 12/2008 | Liao et al. |
| 2009/0053749 | A1 | 2/2009 | Manalis et al. |
| 2009/0280518 | A1 | 11/2009 | Adamo et al. |
| 2013/0230879 | A1 | 9/2013 | Neeves et al. |
| 2014/0087412 | A1 | 3/2014 | Fouras et al. |
| 2016/0341539 | A1 | 11/2016 | Adie et al. |
| 2018/0023111 | A1 | 1/2018 | Schütze et al. |

OTHER PUBLICATIONS

Fletcher, Daniel A., et al., "Cell mechanics and the cytoskeleton", *Nature*, 463(7280), pp. 485-492, (Jan. 28, 2010).
Chowdhury, F., et al., "Material properties of the cell dictate stress-induced Spreading and differentiation in embryonic stem cells", *Nature Materials*, vol. 9, pp. 82-88, (Jan. 2010).
Pelling, A.E., et al. "Mechanical Dynamics of Single Cells During Early Apoptosis", *Cell Motility and the Cytoskeleton*, 66, pp. 409-422, (2009).
Cross, et al., "Nanomechanical analysis of cells from cancer patients", *Nature Nanotechnology*, vol. 2, pp. 780-783, (Dec. 2, 2007).
Lam, W.A., et al., "Chemotherapy exposure increases leukemia cell stiffness", *Blood*, vol. 109(8), pp. 3505-3508, (Apr. 15, 2007).
Hosseini, S.M., et al., "How Malaria Parasites Reduce the Deformability of Infected Red Blood Cells", *Biophysical Journal*, vol. 103, pp. 1-10, (Jul. 2012).
Brown, C.D., et al., "Association of reduced red blood cell deformability and Diabetic nephropathy", *Kidney International*, vol. 67, pp. 295-300, (2005).
Maciaszek, J., et al., "Sickle cell trait human erythrocytes are significantly stiffer than normal", *Journal of Biomechanics*, vol. 44, pp. 657-661, (2011).
Suresh, S., et al., "Connections between single-cell biomechanics and human disease states: gastrointestinal cancer and malaria", *Acta Biomaterialia*, vol. 1(1), pp. 15-30, (2005).
Sinha, A., et al., "Single-cell evaluation of red blood cell biomechanical and nano-structural alterations upon chemically induced oxidative stress", *Scientific Reports*, No. 5:9768, pp. 1-9, (May 7, 2015).
Ciasca, G., et al., "Mapping viscoelastic properties of healthy and pathological red blood cells at the nanoscale level", *Nanoscale*, 7(40), p. 17030-17037, (2015).
Ashkin, Arthur, "Optical trapping and manipulation of neutral particles using lasers", *Proc. Natl. Acad. Sci. USA*, vol. 94(10), pp. 4853-4860, (May 1997).
Rancourt-Grenier, S., et al., "Dynamic deformation of red blood cell in Dual-trap Optical Tweezers", *Opt. Express* 18(10), p. 10462-10472, (2010).
Guck, J., et al., "The Optical Stretcher: A Novel Laser Tool to Micromanipulate Cells", *Biophysical Journal*, vol. 81(2), pp. 767-784, (Aug. 2001).

Otto, O., et al., "Real-time deformability cytometry: on-the-fly cell mechanical phenotyping", *Nature Methods*, vol. 12(3), pp. 199-206, (Mar. 2015).
Lim, C.T., et al., "Large Deformation of living cells using laser traps", *Acta Materialia* 52(7), pp. 1837-1845, (2004).
Moura, D.S., et al., "Automatic real time evaluation of red blood cell elasticity by optical tweezers", *Rev. Sci. Instrum*, 86(5), 053702, (2015).
Lincoln, B., et al., "High-Throughput Rheological Measurements with an Optical Stretcher", Chapter 17, *Methods in Cell Biology*, vol. 83, pp. 397-422, (2007).
Roth, K.B., "High-Throughput Linear Optical Stretcher for Mechanical Characterization of Blood Cells", International Society for Advancement of Cytometry, *Cytometry Part A*, 89(4), pp. 391-397, (2016).
Yao, Z., et al., "ptical Lattice-Based Cell Guiding and Stretching Using Integrated Vertical Multimode-Interference Waveguides", *CLEO; Science and Innovations*, STh3J.6, pp. 1-2, (2018).
Guck, J., et al., "Optical Deformability as an Inherent Cell Marker for Testing Malignant Transformation and Metastatic Competence", *Biophysical Journal*, vol. 88(5), pp. 3689-3698, (May 2005).
Guck, J., et al., "Optical Deformability of Soft Biological Dielectrics", *Physical Review Letters*, vol. 84(23), pp. 5451-5454, (Jun. 5, 2000).
Lincoln, B., et al., "Reconfigurable microfluidic integration of a dual-beam laser trap with biomedical applications", *Biomed Microdevices*, vol. 9(5), pp. 703-710 (2007).
Bellini, N., et al., "Femtosecond laser fabricated monolithic chip for optical trapping and stretching of single cells", *Optics Express*, vol. 18(5), pp. 4679-4688, (Mar. 1, 2010).
Yang, T., et al., "An integrated optofluidic device for single-cell sorting driven by mechanical properties", *Lab Chip*, vol. 15(5), pp. 1262-1266, (2015).
Bragheri, F., et al., "Optofluidic chip for single cell trapping and stretching fabricated by a femtosecond laser", *J. Biophoton*, vol. 3(4), pp. 234-243, (2010).
Dao, M., et al., "Mechanics of the human red blood cell deformed by optical tweezers", *Journal of the Mechanics and Physics of Solids*, vol. 51(11), pp. 2259-2280, (2003).
Lim, C.T., et al., "Large deformation of living cells using laser traps", *Science Direct, Acta Materialia* vol. 52(7), pp. 1837-1845, (2004).
Henon, S., et al., "A New Determination of the Shear Modulus of Human Erythrocyte Membrane Using Optical Tweezers", *Biophysical Journal*, vol. 76(2), pp. 1145-1151, (Feb. 1999).
Liao, Guan-Bo, et al., "One-dimensional jumping optical tweezers for optical stretching of bi-concave human red blood cells", *Optical Society of America, Optics Express*, vol. 16(3), pp. 1-9, (2007).
Agrawal, R., et al. "Assessment of red blood cell deformability in type 2 diabetes mellitus and diabetic retinopathy by dual optical tweezers stretching technigue", *Science Reports*, 6:15873, pp. 1-12, (2016).
Brandao,M.M., et al., "Optical tweezers for measuring red blood cell elasticity: application to the study of drug response in sickle cell disease", *European Journal of Haematology*, vol. 70(4), pp. 207-211, (2003).
Hou, H.W., et al., "Deformability Study of breast cancer cells using microfluidics", *Biomed Microdevices*, vol. 11(3), pp. 557-564, (2009).
Chen, J., et al., "Classification of cell types using a microfluidic device for mechanical and electrical measurement on single cells", *Lap Chip*, vol. 11(18), pp. 3174-3181, (20110.
Adamo, A., et al., "Micorfluidics-Based Assessment of Cell Deformability", *ACS Publications, American Chemical Society*, 84(15), pp. 6438-6443, (2012).
Guo, Q., et al., "Microfluidic analysis of red blood cell deformability", *Journal of Biomechanics*, vol. 47(8), pp. 1767-1776, (2014).
Yang, T., et al., "A Comprehensive Review of Optical Stretcher for Cell Mechanical Characterization at Single-Cell Level", *Micromachines*, 7(90), pp. 1-30, (2016).
Minzioni, P., et al., "Roadmap for optofluidics", *Journal of Optics*, 19, 093003, pp. 1-50, (2017).

(56) References Cited

OTHER PUBLICATIONS

Trotta, G., et al., "Disposable Optical Stretcher Fabricated by Microinjection Moulding", Micromachines, vol. 9:388, pp. 1-12, (2018).
Guo, Q., et al., Microfluidic micropipette aspiration for measuring the deformability of single cells, Lab Chip, 12, pp. 2687-2695, (2012).
Fregin, B., et al., "High-throughput single-cell rheology in complex samples by dynamic real-time deformability cytometry", Nature Communications, pp. 1-11, (2019).
Bento, D., et al., "Deformation of Red Blood Cells, Air Bubbles, and Droplets in Microfluidic Devices: Flow Visualizations and Measurements", Micromachines, 9, 151, pp. 1-18, (2018).
Gossett, D. R., et al., "Hydrodynamic stretching of single cells for large population mechanical phenotyping", Proc. Natl. Acad. Sci. U.S.A., 109(20), pp. 7730-7635, (May 15, 2012).
Masaeli, M., et al., "Multiparameter mechanical and morphometric screening of cells", Scientific Reports, 6:37863, pp. 1-11, (2016).
Mohanty, K., et al., "Orientation of erythrocytes in optical trap revealed by confocal fluorescence microscopy", Journal of Biomedical Optics, vol. 12(6), pp. 060506-1-060506-3, (Nov./Dec. 2007).
Grover, S.C., et al. "Analysis of the behaviour of erythrocytes in an optical trapping system", Optics Express, vol. 7(13), pp. 1-7, (Dec. 18, 2000).
Hale, G. M., et al. "Optical Constants of Water in the 200-nm to 200-µm Wavelength Region", Applied Optics, vol. 12(3), 555-563, (Mar. 1973).
Eriksson, L.E., Göran, "On the shape of human red blood cells interacting with flat artificial surfaces—the 'glass effect'", Biochimica et Biophysica Acta, 1036, pp. 193-201, (1990).
Ray, Manohar, "XLVI. Application of Bessel functions to the solution of problem of motion of a circular disk in viscous liguid", The London, Edinburgh, and Duvlin Philosophical Magazine and Journal of Science, 21:141, pp. 546-564, (Apr. 1, 2009).
Lautrup, B., Physics of Continuous Matter, Second Edition, exotic and Everyday Phenomena in the Macroscopic World, CRC Press, Taylor & Francis Group, (2005).
Kang, Yang Jun, et al., "A microfluidic device for simultaneous measurement of viscosity and flow rate of blood in a complex fluidic network", Biomicrofluidics, 7, p. 054111-1-054111-12, (2013).
Yoon, Young-Zoon, et al., "Non-linear mechanical response of the Red Blood Cell", arXiv:0710.3333v1 [con-mat.soft], pp. 1-5, (Oct. 17, 2007).
Yoon, Young-Zoon, et al., "Red blood cell dynamics: from spontaneous fluctuations to non-linear response", Soft Matter, 7, pp. 2042-2051, (2011).
Raj, S., et al., "Studying Single Red Blood Cells Under a Tunable external Force by Combining Passive Microrheology with Raman Spectroscopy", Cell Biochem Biophys, 65, pp. 347-361, (2013).
Sheikh-Hasani, V., et al., "Atorvastatin treatment softens human red blood cells: an optical tweezers study", Biomedical Optics Express, vol. 9(3), pp. 1-6, (Mar. 1, 2018).
Migneault, I., et al. "Glutaraldehyde: behavior in agueous solution, reaction with proteins, and application to enzyme crosslinking", BioTechniques, vol. 37, pp. 790-802, (Nov. 2004).
Abay, A., et al., "Glutaraldehyde—A Subtle Tool in the Investigation of Healthy and Pathologic Red Blood Cells", Frontiers in Physiology, Original Research, vol. 10, Article 514, pp. 1-14, (May 2019).

"Dynamic Single-Cell Analysis for Quantitative Biology" Analytical Chemistry, pp. 7918-7925, (Dec. 1, 2006).
Polimeno, Paolo, et al., "Optical tweezers and their applications", Journal of Quantitative Spectroscopy & Radiative Transfer, 218, pp. 131-150, (2018).
Silva, C.A.L., et al., "Vitamin E nanoemulsion activity on stored red blood cells", Official Journal of the British Blood Transfusion Society, pp. 213-217, (2017).
Faigle, C., et al. "A monolithic glass chip for active single-cell sorting based on mechanical phenotyping", Lab Chip, vol. 15, pp. 1267-1275, (2015).
Gossett, D. R., et al., "Hydrodynamic stretching of single cells for large population mechanical phenotyping", Proc. Natl. Acad. Sci. U.S.A., vol. 109(20), pp. 7630-7635, (May 15, 2012).
Deng, Y, et al., "Inertial Microfluidic Cell Stretcher (iMCS): Fully Automated, High-Throughput, and Near Real-Time cell Mechanotyping", Advanced Science News, Small, 13(28), pp. 1-11, (2017).
Yao, Z., et al., "Integrated Optofluidic Cell Stretchers Using Optical Lattices generated from Vertically Embedded Multimode-Interference Waveguides", CLEO: Science and Innovations, SW4G.2, pp. 1-2, (2016).
Yao, Z., et al., "Vertically Embedded Multimode-Interference Waveguide-Based Optical Stretchers for Mechanical Characterization of Cells", CLEO: Science and Innovations, SM4C.2, pp. 1-2, (2017).
Kim, J., et al., "Advances in the measurement of red blood cell deformability: A Brief review", Journal of Cellular Biotechnology 1, pp. 63-79, (2015).
Yu, L., et al., "Three-dimensional light-scattering and deformation of individual biconcave human blood cells in optical tweezers", Optics express, pp. 1-12, (2013).
Happel, John, "Low Reynolds number hydrodynamics, Mechanics of fluids and transport processes", Martinus Nijhoff Publishers, ISBN-13:978-920-247-2877-0, DOI: 1007/978-94-009-8352-6, (1983).
Van Vliet, K.J., et al., The biomechanics toolbox: experimental approaches for living cells and biomolecules, Acta Materialia, vol. 51(19), pp. 5881-5905, (2003).
Pravincumar, P., et al., "Viscoelastic Cell Mechanics and Action Remodeling Are Dependent on the Rate of Applied Pressure", PLOS One, vol. 7, Issue 9, e43938, Sep. 11, 2012).
Kasukurti, A., et al., "FACS-style detection for real-time cell viscoelastic cytomertry", RSC Adv, 5(128), p. 105636-105642, (2015).
Jackson, John David, "Classical Electrodynamics", John Wiley & Sons, Inc. ISBN 0 471 43131 1, Part 1, 70 pages, (1962).
Jackson, John David, "Classical Electrodynamics", John Wiley & Sons, Inc. ISBN 0 471 43131 1, Part 2, 78 pages, (1962).
Jackson, John David, "Classical Electrodynamics", John Wiley & Sons, Inc. ISBN 0 471 43131 1, Part 3, 70 pages, (1962).
Jackson, John David, "Classical Electrodynamics", John Wiley & Sons, Inc. ISBN 0 471 43131 1, Part 4, 107 pages, (1962).
Jackson, John David, "Classical Electrodynamics", John Wiley & Sons, Inc. ISBN 0 471 43131 1, Part 5, 120 pages, (1962).
Jackson, John David, "Classical Electrodynamics", John Wiley & Sons, Inc. ISBN 0 471 43131 1, Part 6, 76 pages, (1962).
Jackson, John David, "Classical Electrodynamics", John Wiley & Sons, Inc. ISBN 0 471 43131 1, Part 7, 73 pages, (1962).
Jackson, John David, "Classical Electrodynamics", John Wiley & Sons, Inc. ISBN 0 471 43131 1, Part 8, 64 pages, (1962).

* cited by examiner

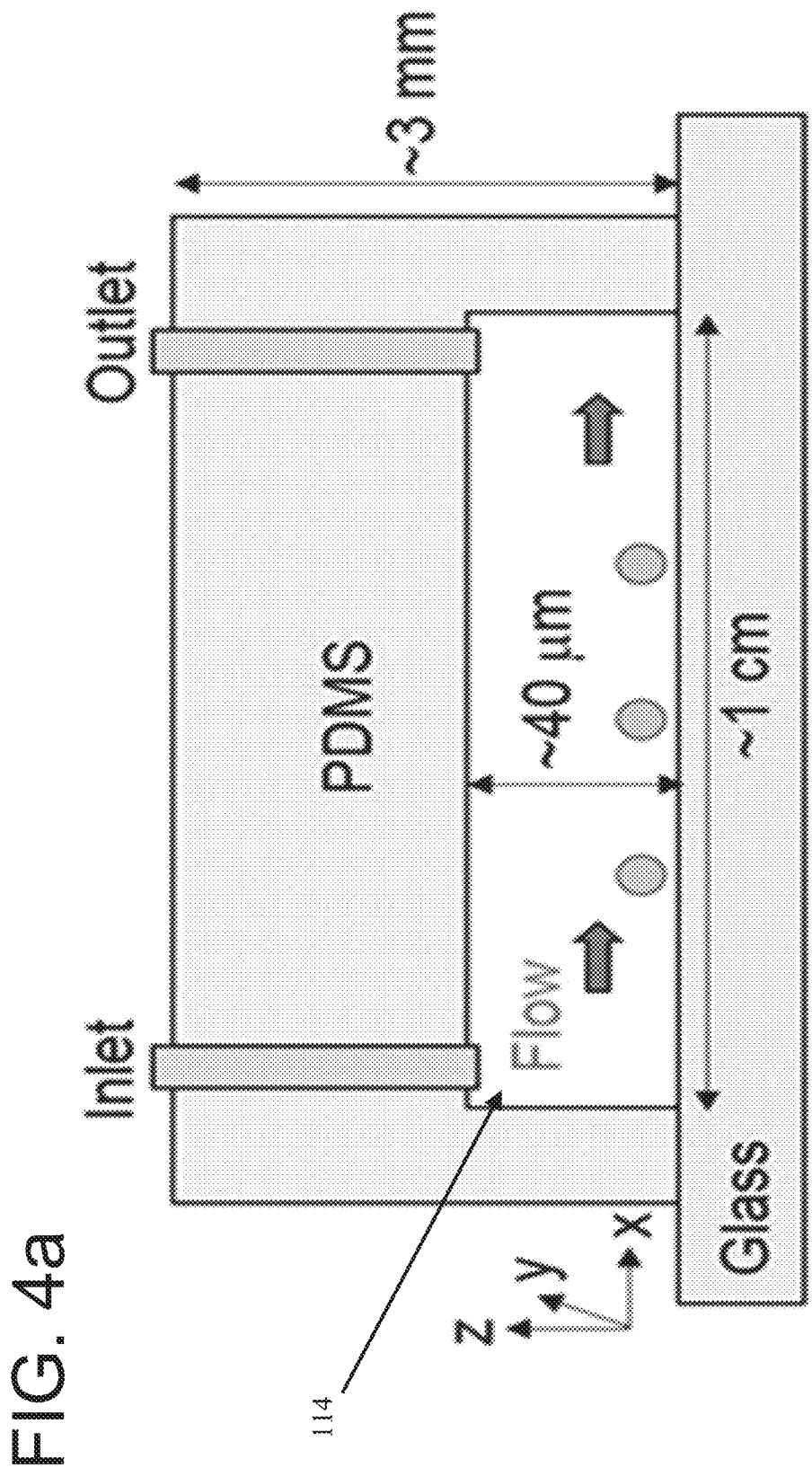

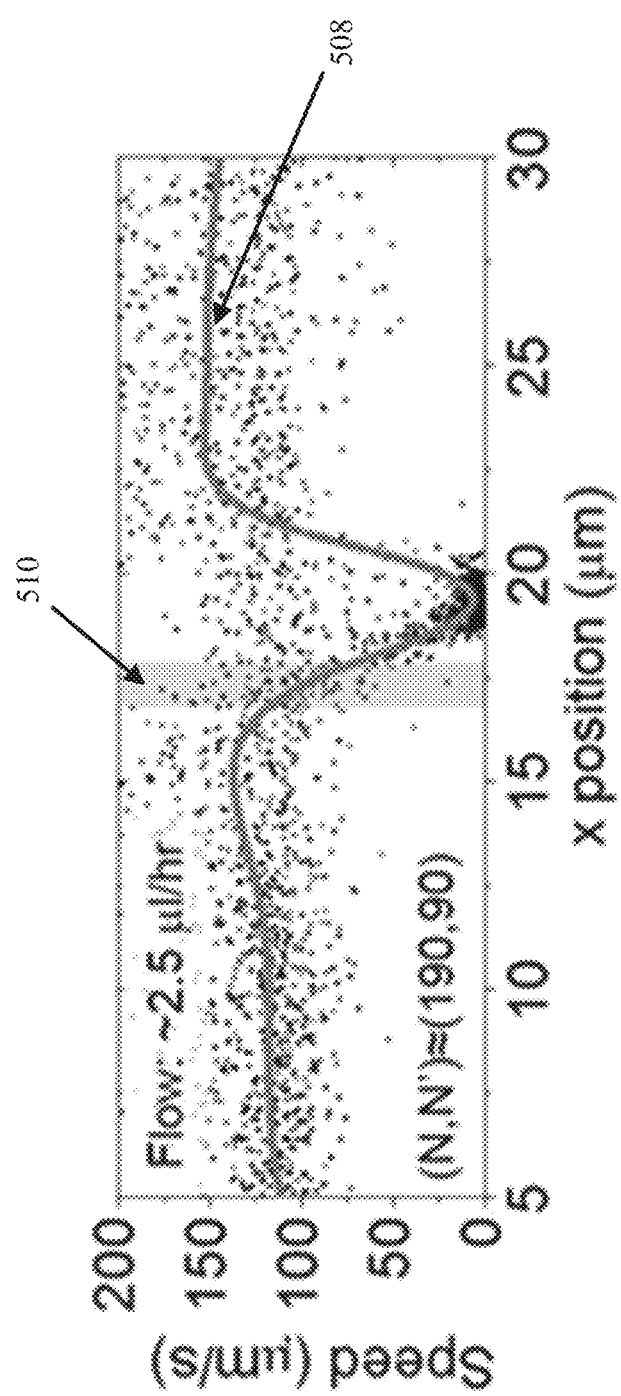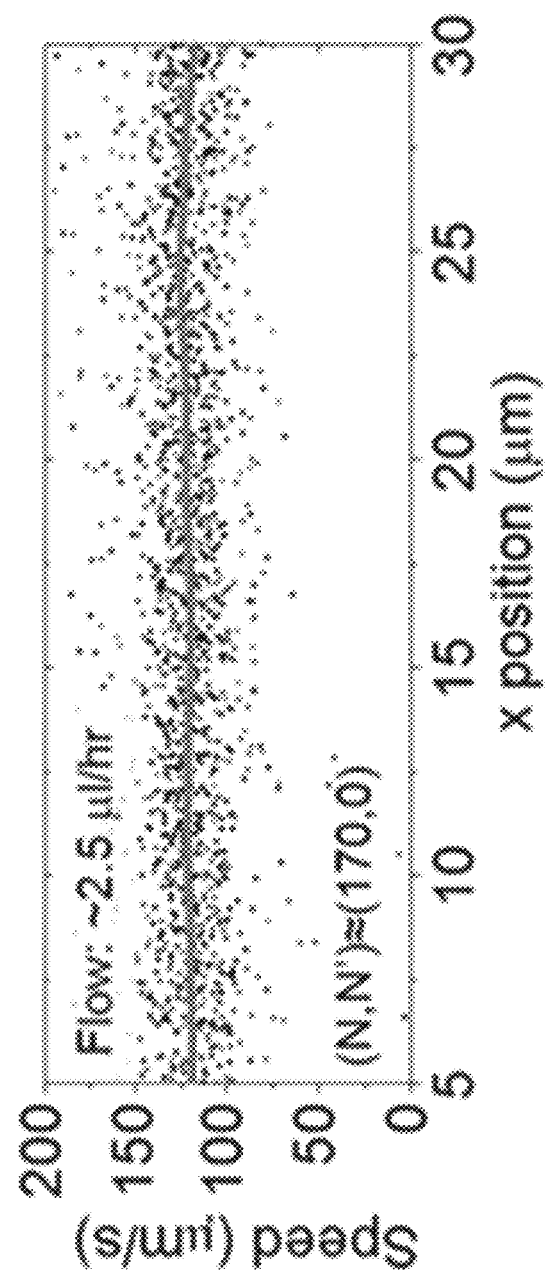
FIG. 5b
FIG. 5c

METHOD AND SYSTEM FOR OPTOFLUIDIC STRETCHING OF BIOLOGICAL CELLS AND SOFT PARTICLES

CROSS-REFERENCE TO RELATED APPLICATIONS

This patent application claims the benefit of U.S. Provisional Patent Application No. 62/918,234, filed Jan. 23, 2019, and U.S. Provisional Patent Application No. 62/954,047, filed Dec. 27, 2019, both of which are incorporated by reference herein in their entirety.

BACKGROUND

Mechanical properties of biological cells may be utilized as an inherent and label-free biomarker to indicate the physiological and pathological changes of cells. The variation of cell deformability is linked with the change of underlying cellular cytoskeleton, which has been found to be associated with a broad range of functional changes of cells, including differentiation, apoptosis, disease transformation and drug response. For example, there is growing evidence that the reduction of deformability of human red blood cells (RBCs) may be a symptom of various human diseases, such as malaria infection, diabetes, and sickle cell anemia. For the case of Plasmodium Falciparum Malaria, recent experiments have shown that the membrane stiffness of parasitized RBCs can be increased ten-fold. These findings suggest that characterization of cell deformability may be a useful tool to distinguish healthy and unhealthy cells for disease diagnosis.

The mechanical properties of cells have been attracting intensive research interest over the past few decades. Various techniques have been developed to assess the mechanical deformability of single cells. Conventional characterization techniques include micropipette aspiration, atomic force microscopy, and optical tweezers with high-refractive-index microbeads (e.g., silica or polystyrene microbeads) attached to two ends of the cell for mechanical loading.

The above techniques involve direct physical contacts between solid surfaces and the cells under testing. Direct physical contacts may modify the natural behaviors of the cells or even damage the cells during the measurement. Furthermore, the above techniques are all based on a static test condition, which implicates a low characterization throughput (e.g., approximately 10 cells per hour).

Optical tweezers have been developed which can provide non-contact, non-invasive and optically induced cell deformation. A standard optical tweezer comprises a highly focused Gaussian laser beam, which is able to exert pico-Newton-scale optical forces to micro-sized transparent objects for optical trapping and manipulation. The optical force of an optical tweezer can be decomposed into two components, namely the optical gradient force that attracts high-refractive-index objects towards the beam waist center where the optical field has the highest intensity, and the scattering force that pushes the objects along the longitudinal beam propagation direction. With a highly focused laser beam, the optical gradient force component in the longitudinal direction can balance the scattering force, resulting in a conventional single laser beam tweezer. Dual optical tweezers have also been adopted for deforming cells by directly applying two parallel propagating focused laser beams at two ends of a cell to mechanically stretch the cell along the separation direction of the two beams. Another type of optical cell stretchers comprises two counter-propagating divergent beams emanating from two optical fibers, where cells are optically trapped and stretched along the longitudinal direction of the two laser beams. However, existing optical-force-only cell stretchers (e.g., the dual optical tweezers, optical cell stretcher with two counter-propagating divergent beams, and/or optical tweezers with or without microbead attachments) rely on a static condition during the test to minimize the effects of fluidic stress on the cell deformation. As such, this causes a low characterization throughput.

Additionally, methods using microfluidic devices have been developed for studying cell deformation using fluidic flow-induced hydrodynamic forces. Microfluidic devices contain microfluidic channels that are usually in the micro- and milli-meter scale with an inlet and an outlet to connect with the outside environment, in which fluids and biological samples can be precisely controlled and studied. An existing solution deforms the cells when they flow through at a high speed through straight and narrow microfluidic channels with cross-sectional dimensions close to the cell size. Cells are deformed under the fluidic stress when interacting with the non-uniformly distributed flow in the cross-section of the narrow microfluidic channel. However, cells are deformed over a short time scale of ~1 ms, and thus the extracted cell stiffness is not comparable with the static stiffness measured using the static testing. Besides, this solution imposes a high requirement on the imaging system, with an exposure time of 1 μs and a frame rate of 4000 fps.

SUMMARY

In an exemplary embodiment, the present application provides an optofluidic system for stretching a plurality of sample isolates. The optofluidic system includes: a microfluidic flow system comprising at least one microfluidic channel and a microfluidic pump; an optical tweezer system configured to generate an optical tweezer directed towards the at least one microfluidic channel; an image processing system configured to capture images of the plurality of sample isolates within the at least one microfluidic channel; and one or more processors. The one or more processors are configured to: trap, using the optical tweezer system, the plurality of sample isolates away from a wall of the at least one microfluidic channel; generate, using the microfluidic pump of the microfluidic flow system, a microfluidic flow to stretch the plurality of trapped sample isolates; determine deformation characteristics of the plurality of stretched sample isolates based on one or more frames from the image processing system; and output information corresponding to the deformation characteristics.

In another exemplary embodiment, the present application provides a method for stretching a plurality of sample isolates. The method includes: trapping, using an optical tweezer system configured to generate an optical tweezer, the plurality of sample isolates away from a wall of at least one microfluidic channel of a microfluidic flow system; generating, using a microfluidic pump of the microfluidic flow system, a microfluidic flow to stretch the plurality of trapped sample isolates; determining, by one or more processors, deformation characteristics of the plurality of stretched samples isolates based on one or more frames from an image processing system; and outputting, by the one or more processors, information corresponding to the deformation characteristics.

In yet another exemplary embodiment, the present application provides a non-transitory computer-readable storage medium comprising computer-executable instructions that, when executed by one or more processors of an optofluidic system, causes the optofluidic system to: trap, using an optical tweezer system configured to generate an optical tweezer, the plurality of sample isolates away from a wall of at least one microfluidic channel of a microfluidic flow system; generate, using a microfluidic pump of the microfluidic flow system, a microfluidic flow to stretch the plurality of trapped sample isolates; determine deformation characteristics of the plurality of stretched samples isolates based on one or more frames from an image processing system; and output information corresponding to the deformation characteristics.

BRIEF DESCRIPTION OF THE DRAWINGS

FIGS. 4a and 4b show a cross-sectional and top view of a fabricated microfluidic chip with an inlet and an outlet for continuous sample isolate delivery, collection, and/or imaging.

FIGS. 5b and 5c show the scatter plot of the cell speed as a function of the x location within and outside a region of interest.

DETAILED DESCRIPTION

Exemplary embodiments of the present invention provide a method and system for optofluidic stretching of biological cells and soft particles. For example, exemplary embodiments of the present invention provide an efficient, detailed, convenient and reproducible method and system for utilizing a tweeze-and-drag process to mechanically stretch biological cells and soft particles. In some instances, for the optofluidic stretching, an optical tweezer system (e.g., a Gaussian laser) is used to trap the cell or particle and a microfluidic flow system is used to stretch the cell or particle.

In an exemplary embodiment, the present invention provides a method for optofluidic stretching of biological cells and soft particles using an optical tweezer formed by a highly focused, continuous wave (cw) laser Gaussian beam and a fluidic flow within a microfluidic channel. The Gaussian beam may be in a near-infrared 1064 nm wavelength in 10 s of mW optical power. In other words, the optofluidic stretching is based on a tweeze-and-drag process, where the optical tweezer device uses an optical tweezer (e.g., beam) to trap a cell or a particle in the microfluidic flow. While the trapped cell or particle is in the microfluidic flow, the trapped cell or particle is dragged and stretched by the flow of the microfluidic flow device that is transverse to the beam. Additionally, and/or alternatively, the laser beam is periodically blocked to allow momentarily trapping and releasing of the cell or the particle. Periodically blocking the laser beam allows a continuous delivery of cells or particles by the microfluidic flow device into the tweezer during the test.

Advantageously, the cells or particles are trapped by the tweezer at a position away from the microfluidic channel walls and the substrate to avoid any physical contacts between the cells/particles and solid surfaces. In other words, exemplary embodiments of the invention provide for non-contact and continuous characterization of the mechanical properties of multiple biological cells and soft particles. Additionally, exemplary embodiments of the invention provide for high throughput (e.g., approximately 1 cell per second) corresponding to fast characterizations or screenings of multiple cells, thereby facilitating the acquisition of statistically relevant results for heterogeneous biological cells.

Figure 1A:
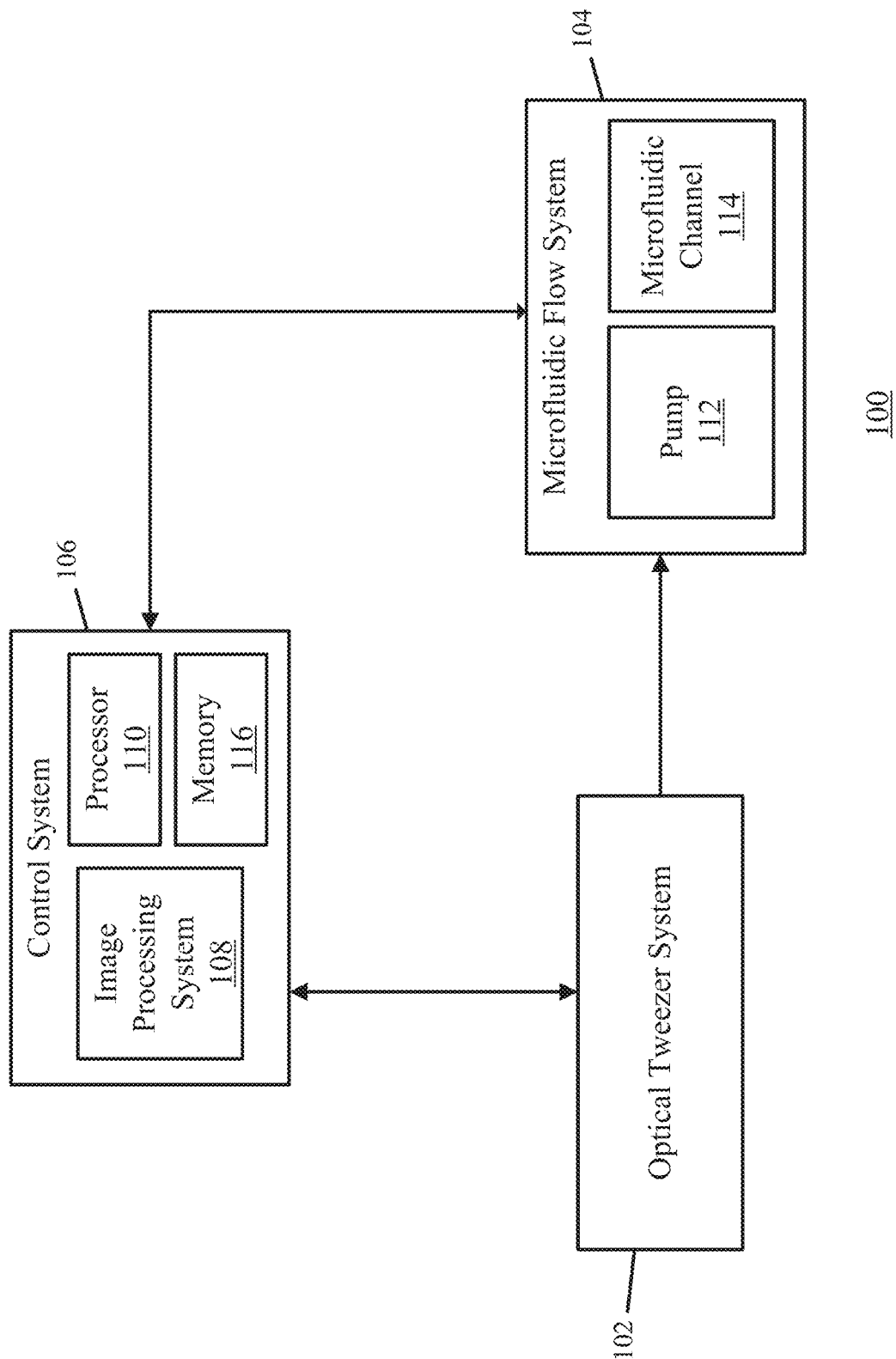
FIG. 1a shows an exemplary optofluidic system for optofluidic stretching of biological cells and soft particles.

FIG. 1a shows an exemplary optofluidic system 100 for optofluidic stretching of biological cells and soft particles. The optofluidic system 100 includes an optical tweezer system 102, a microfluidic flow system 104, and a control system 106. The optical tweezer system 102 includes one or more devices and/or other components to trap sample isolates (e.g., biological cells and/or soft particulars such as red blood cells). For example, the optical tweezer system 102 includes a light source (e.g., a Gaussian laser) that provides a beam (e.g., an optical tweezer) to trap sample isolates within the microfluidic flow system 104.

The microfluidic flow system 104 includes a pump 112 and one or more microfluidic channels 114. The one or more microfluidic channels 114 are microfluidic passageways for the sample isolate to traverse through. The pump 112 may be any type of pump or other device that can provide a microfluidic flow to drive the sample isolate through the microfluidic channel 114. Additionally, and/or alternatively, while the optical tweezer system 102 traps a sample isolate within the microfluidic channel 114, the microfluidic flow from the pump 112 stretches the sample isolate. The optical tweezer system 102 traps the sample isolate away from the walls of the microfluidic channel 114, which will cause there to be little to no physical contact between the sample isolate and the walls of the microfluidic channel 114.

The control system 106 controls the operation of the optofluidic system 100. For example, the control system 106 provides instructions to the optical tweezer system 102 and/or the microfluidic system 104 to trap and stretch the sample isolates. In the optofluidic system 100, the control system 106 includes the image processing system 108, the processor 110, and memory 116. However, in some examples, the control system 106 is a separate entity from the image processing system 108.

The image processing system 108 includes one or more devices and/or components that captures images used to determine the deformation of the sample isolate. For example, the image processing system 108 includes an image capturing device (e.g., a camera) that is used to capture images of the stretched sample isolates.

The processor 110 may be any type of device, controller, apparatus, circuitry, and/or logic used to control the operation of the optofluidic system 100 based on one or more inputs. For example, the processor 110 may receive information indicating the images and/or videos of the sample isolate. The processor 110 may determine and/or extract the deformation characteristics based on the images and/or videos. The processor 110 may be contained within a single device, or there may be multiple processors in a plurality of devices connected together to provide the functionality described herein.

The memory 116 may be a non-transitory computer readable medium that includes processing instructions and/or may be used to store the images or videos. The processor 110 may execute the processing instructions stored in the memory 116 to control the operation of the optofluidic system 100. The memory 116 may be any type of memory including a computer-readable carrier such as solid-state memory, magnetic disk, and optical disk comprising the processing instructions and data structures that would cause a processor 110 to carry out the functions described herein.

In some instances, the microfluidic channel 114 is formed or made using a patterned transparent material. In other words, the walls and substrates of the microfluidic channel 114 are formed using a patterned transparent material that causes these walls and substrates to be transparent when imaging the sample isolates using the image processing system 108. Additionally, and/or alternatively, the cross-section of the microfluidic channels 114 may larger than a sample isolate.

Figure 1B:
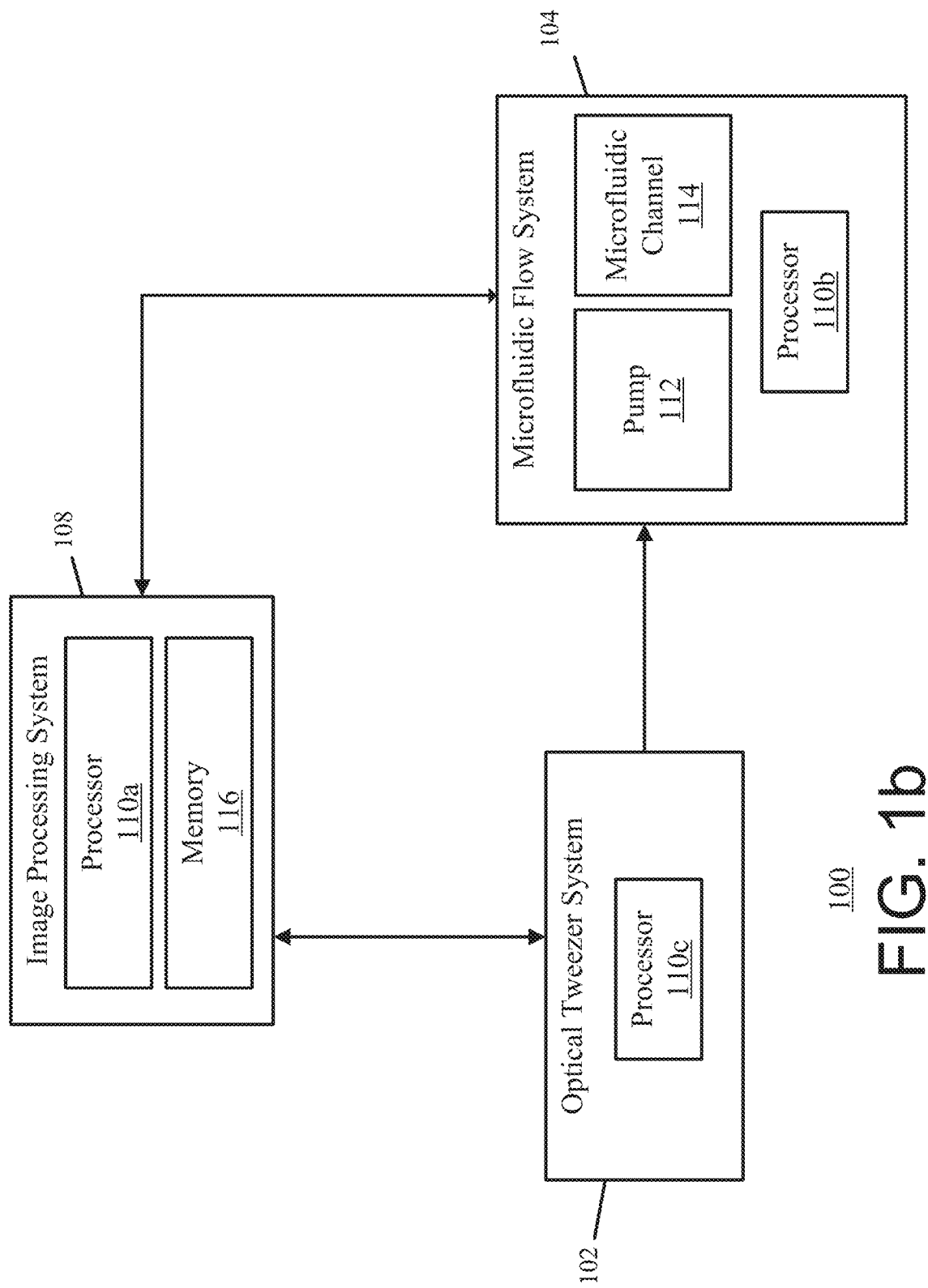
FIG. 1b shows another exemplary optofluidic system for optofluidic stretching of biological cells and soft particles.

It will be appreciated that the exemplary system depicted in FIG. 1a is merely an example, and that the principles discussed herein may also be applicable to other situations and system configurations. For instance, FIG. 1b shows another exemplary optofluidic system 100 for optofluidic stretching of biological cells and soft particles. FIG. 1b is similar to FIG. 1a and includes the image processing system 108, the optical tweezer system 102, and the microfluidic flow system 104. Furthermore, system 100 in FIG. 1b includes multiple separate processors 110a, 110b, and 110c. The processors 110a, 110b, and 110c are configured to control the optical tweezer system 102, the microfluidic flow system 104 and/or the image processing system 108. In other words, system 100 from FIG. 1b uses separate processors 110a, 110b, and 110c distributed among the different systems instead of one or more processors in a centralized control system to stretch the sample isolates within the microfluidic channel 114 and to determine the deformation characteristics. To provide another example, although the processors 110, 110a, 110b, and 110c are depicted as being a single processor in some examples, it will be appreciated that the functionality discussed herein with respect to the processors may be implemented by one or more processors. Additionally, although the microfluidic channel 114 is depicted as being a single microfluidic channel, it will be appreciated that the functionality discussed herein with respect to the microfluidic channel 114 may be implemented by one or more microfluidic channels.

The optical tweezer system 102, the microfluidic flow system 104, the control system 106, and/or the image processing system 108 will be described in further detail below.

Figure 2:
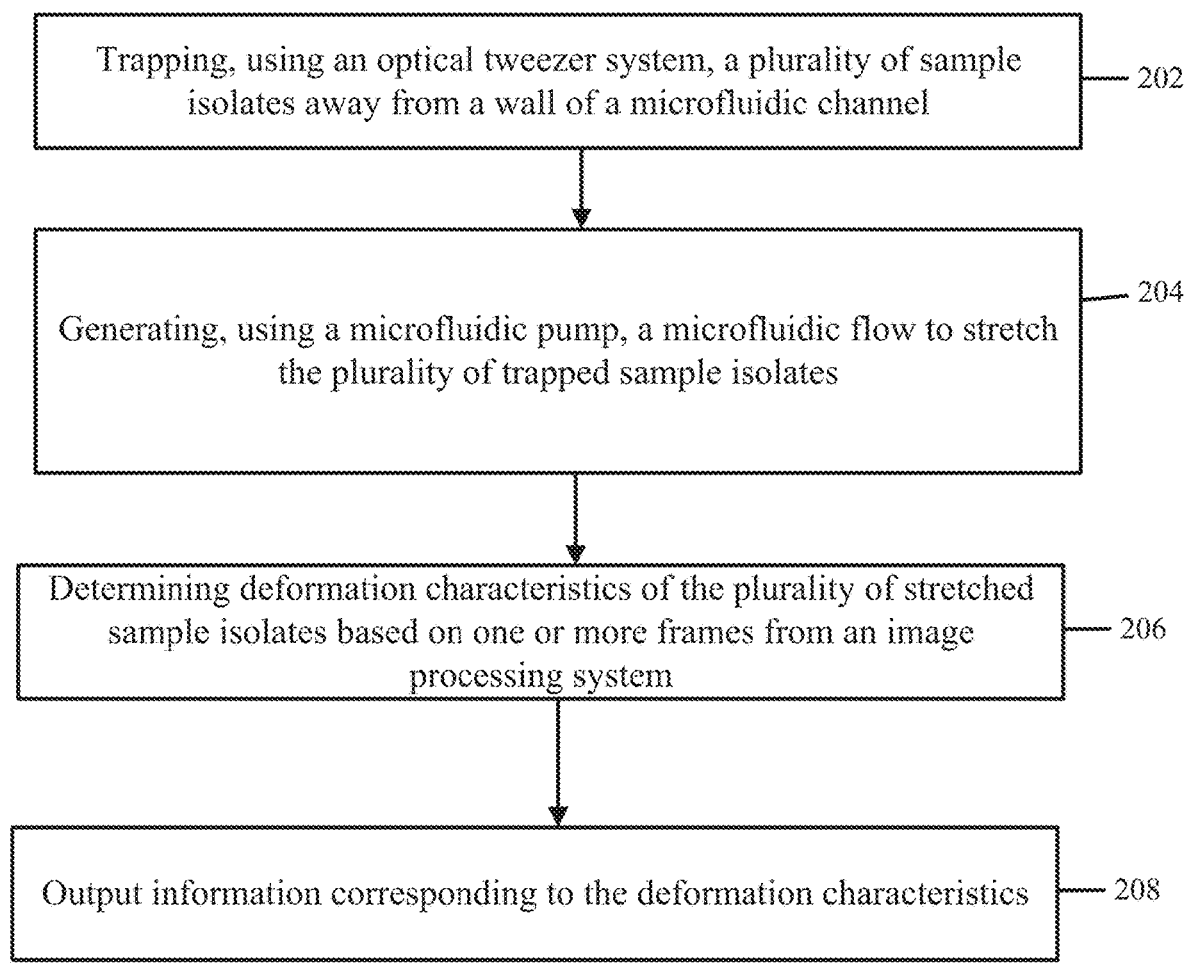
FIG. 2 shows an exemplary process for optofluidic stretching of biological cells and soft particles.

FIG. 2 shows an exemplary process 200 for optofluidic stretching of biological cells and soft particles. The exemplary optofluidic system 100 from FIG. 1a may perform the process 200. However, in some instances, the optofluidic system 100 may be modified such as described above in connection with FIG. 1b and/or described below in connection with FIGS. 9-15 and used to implement the process 200.

In operation, at block 202, an optical tweezer system 102 traps a plurality of sample isolates away from a wall of a microfluidic channel 114. For example, a processor 110 provides one or more instructions to the optical tweezer system 102. Based on the instructions, the optical tweezer system 102 uses an optical device/light source (e.g., a Gaussian laser) to provide a beam/optical tweezer (e.g., a highly focused, CW laser Gaussian beam) to the microfluidic channel 114. The beam traps the sample isolate within the microfluidic channel 114 such that there is little to no physical contact with the sample isolates and the wall of the microfluidic channel 114.

The processor 110 may generate the optical tweezer to trap the plurality of sample isolates using a wavelength within a spectral window (e.g., wavelength range) of the optical tweezer system 102. For example, the spectral window may be a wavelength range that causes the optical tweezer to be transparent to the plurality of trapped sample isolates, which may cause minimum light absorption in the sample isolates and reduce photo-damage to the sample isolates. In other examples, the spectral window may be a wavelength range that causes the optical tweezer to be transparent to a medium of the microfluidic channel 114, which may cause minimal light absorption in the medium and reduce heat generation within the medium. In yet other examples, the spectral window may be a wavelength range that causes the optical tweezer to be transparent to a substrate of the microfluidic channel 114, such that the light from the optical tweezer system 102 may transmit through the substrate without too much loss. In yet other examples, the spectral window may be a wavelength range that causes the optical tweezer to be transparent to a wall of the microfluidic channel 114, such that the light from the optical tweezer system 102 may not induce much heat in the channel walls.

At block 204, a microfluidic pump 112 generates a microfluidic flow to stretch the plurality of trapped sample isolates, for example, based on instructions received from the processor 110. Furthermore, the fluid within the microfluidic channel has a lower refractive index than the sample isolates. In other words, after the optical tweezer system 102 traps a sample isolate, the pump 112 provides a microfluidic flow to the microfluidic channel 114 and stretches the sample isolate. By trapping the sample isolate away from the walls of the microfluidic channel 114, there may be no physical contact between the sample isolate and the microfluidic channel 114 when the microfluidic flow stretches the sample isolate.

At block 206, deformation characteristics of the plurality of stretched sample isolates are determined, for example, by the processor 110, based on one or more frames captured by an image processing system 108. For example, during and/or after stretching the sample isolates, the image processing system 108 captures frames (e.g., images and/or video frames) of the stretched sample isolates. The processor 110 receives the captured frames and analyzes these frames to determine deformation characteristics of the sample isolates. The deformation characteristics may indicate a comparison between a stretched state of the sample isolate and an un-stretched state of the sample isolate, the cell diameters in a flow direction ($d_x$) and transverse to the flow direction ($d_y$), and/or the ratio between the two cell diameters ($d_x/d_y$).

In some instances, the deformation characteristics are a comparison of ratios (e.g., a ratio between a first diameter ($d_x$) and a second diameter ($d_y$)) between sample isolates prior to and after stretching. For example, the processor 110 may receive a frame of a sample isolate prior to stretching the sample isolate (e.g., prior to block 202 and/or 204). The processor 110 may also receive a frame of a sample isolate after stretching the sample isolate (e.g., after block 204). The processor 110 may determine ratios between a first diameter in a first dimension (e.g., x-dimension) and a second diameter in a second dimension (e.g., y-dimension) for both of the frames. The processor 110 may determine the deformation characteristics based on a comparison between these two ratios. Additionally, and/or alternatively, the processor 110 may determine deformation characteristics for multiple different sample isolates (e.g., multiple different comparisons between ratios for $d_x$ and $d_y$). In some instances, the processor 110 may determine an average value based on the multiple different sample isolates (e.g., the multiple different numerical values for the comparisons between the ratios).

At block 208, information corresponding to the deformation characteristics is output, for example, by the processor 110. For example, the control system 106 and/or the optofluidic system 100 includes a display device (e.g., monitor, mobile device/smartphone, laptop, desktop, and/or other devices capable to display information). The processor 110 provides information corresponding to the deformation characteristics to the display device. In some instances, the information corresponding to the deformation characteristics may include any and/or all of the information and/or graphical representations from the FIGs. below.

In some examples, the processor 110 determines a particular treatment or prophylaxis for a disease or medical condition based on the deformation characteristics of the plurality of stretched sample isolates. The processor 110 outputs or provides for display the determined treatment and/or prophylaxis. For example, using the determined deformation characteristics from block 206, the processor 110 may determine a treatment or diagnosis for a disease or medical condition. For instance, by determining the deformation characteristics of a red blood cell and based on comparing the determined deformation characteristics to reference values or thresholds, the processor 110 may determine that a patient has a symptom of a disease such as malaria infection, diabetes, and sickle cell anemia, and may further determine a treatment or prophylaxis relating thereto. For example, the determined deformation characteristics may indicate a first value (e.g., a measurement, distance, and/or diameter) of a sample isolate prior to stretching the sample and a second value of the sample isolate after stretching the sample. The processor 110 may compare the first value with the second value and based on the comparison exceeding a threshold (e.g., pre-determined, pre-defined, and/or user-defined), the processor 110 may determine that the patient has a symptom of a disease. The processor 110 may further provide for the display of an indication of that the patient has the symptom of the disease, and may further provide for display of a corresponding treatment or prophylaxis.

Additionally, and/or alternatively, the processor 110 may provide for display of information indicating the deformation characteristics (e.g., the first and second value). A user (e.g., doctor) may use the displayed deformation characteristics and/or other displayed information (such as an indication of a symptom of a disease and/or a treatment or prophylaxis relating thereto) to determine a diagnosis and/or to make treatment decisions.

Additionally, and/or alternatively, the optofluidic system 100 applies a modulation to the beam (e.g., optical tweezer) from the optical tweezer system 102 to turn the beam for trapping sample isolates on and off. For example, when the beam is turned on, a sample isolate is trapped by the beam, stretched by the microfluidic flow from the microfluidic flow system 104, and imaged by the image processing system 108. When turned off, the sample isolate is released by the optical tweezer system 102 and the microfluidic flow provides new sample isolate(s) to stretch and image. As such, by using the modulation signal (shown as 310 in FIG. 3*a*, which is described below), the optofluidic system 100 continuously traps and releases sample isolates, wherein the sample isolates are stretched and imaged while trapped.

In some instances, the optical tweezer system 102 includes a modulation device (e.g., a chopper). The processor 110 provides the modulation signal to the modulation device to periodically turn on and/or off the beam that traps the sample isolate. The modulation device may be and/or include a chopper, an acousto-optic modulator, an electro-optic modulator, a spatial light modulator, a scanning mirror.

In some variations and referring to FIG. 1*b*, different processors may carry out different blocks of process 200. For example, at block 202, the processor 110*c* of the optical tweezer system 102 controls the optical tweezer system 102 to trap the plurality of sample isolates away from a wall of the microfluidic channel 110. At block 204, the processor 110*b* of the microfluidic flow system 104 uses the microfluidic pump 112 to generate a microfluidic flow to stretch the plurality of trapped sample isolates. At block 206, the processor 110*c* of the image processing system 108 determines the deformation characteristics of the plurality of stretched sample isolates. At block 208, the processor 110*c* also outputs information corresponding to the deformation characteristics. In other variations, other processors may carry out one or more blocks from process 200. For instance, the processor 110*a*, 110*b*, or some other processor may perform block 208.

Figure 3A:
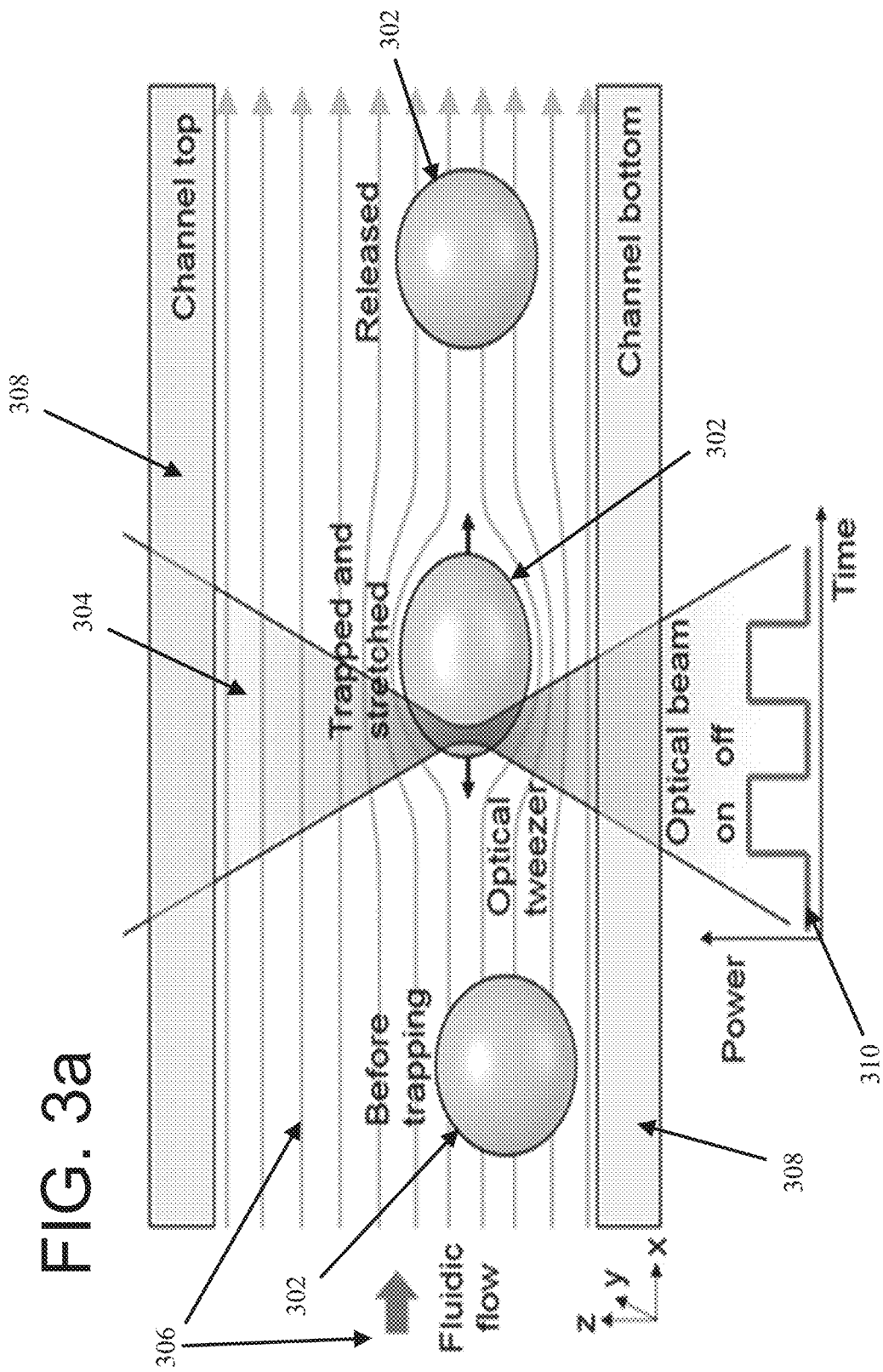
FIGS. 3a-c show an exemplary schematic implementation of the optofluidic system.
Figure 3B:
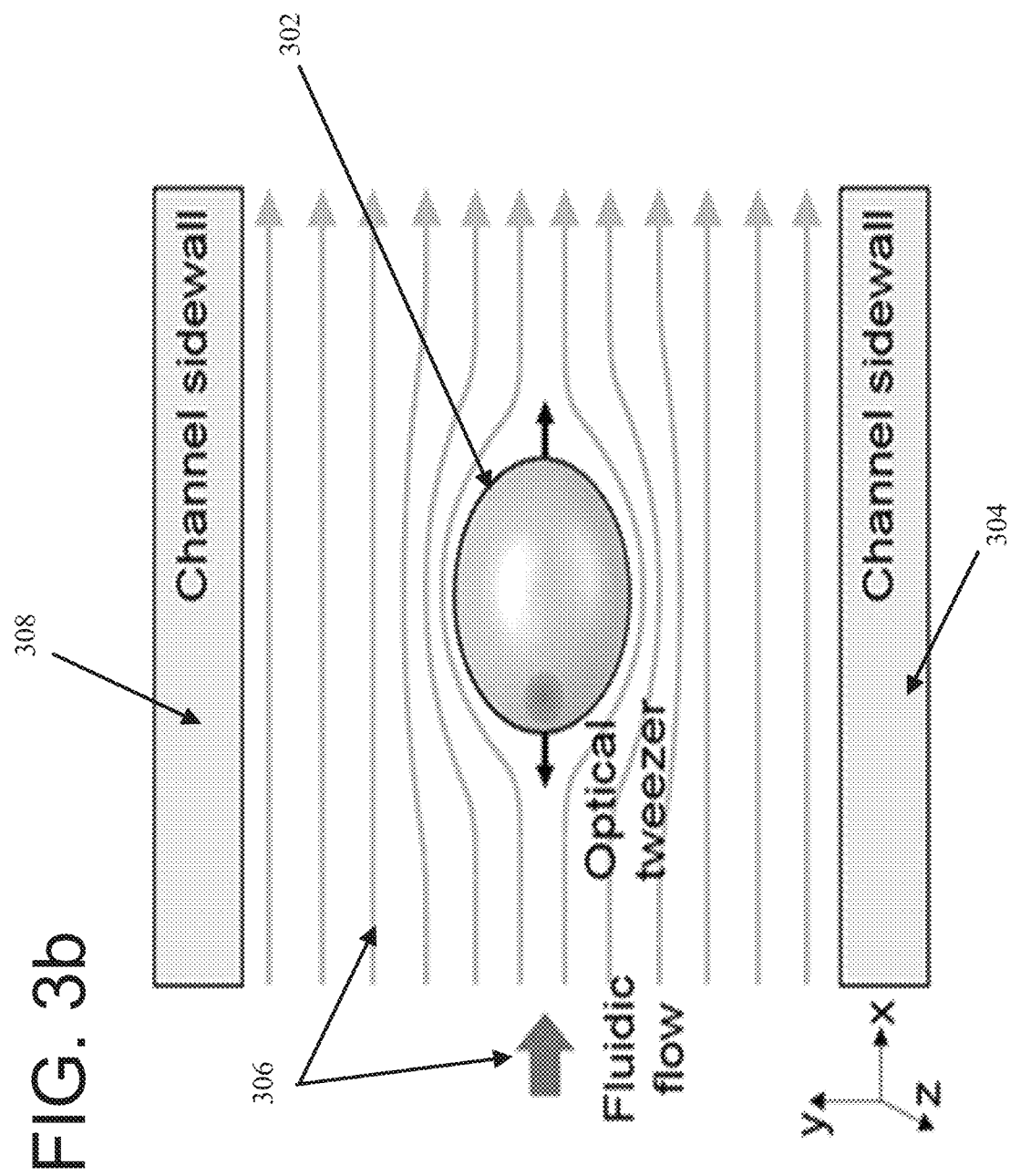
Figure 3C:
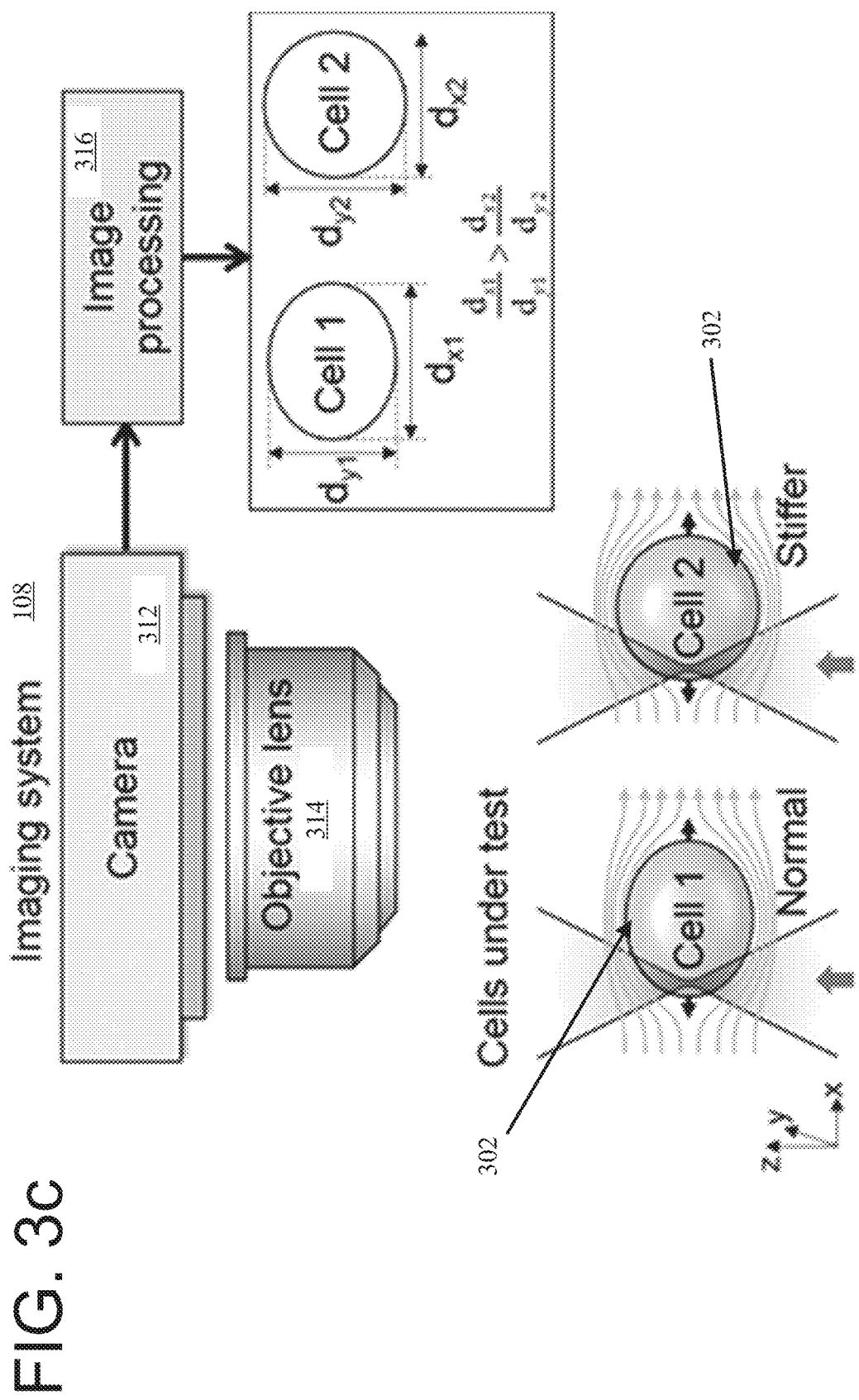

Examples of optofluidic system 100 and process 200 will be discussed in more detail in connection with FIGS. 3-15. The processor 110 referred to in the FIGs. below may be and/or include the processor 110 from FIG. 1*a* and/or the processors 110*a*, 110*b*, and 110*c* from FIG. 1*b*. FIGS. 3*a-c* show an exemplary schematic implementation of the optofluidic system 100. For example, FIG. 3*a* shows a side-view of the schematic implementation of the optofluidic system 100. FIG. 3*b* shows a top view of the schematic implementation of the optofluidic system 100. FIG. 3*c* shows an exemplary deformation characterization scheme used by the processor 110 to determine deformation characteristics of the sample isolates.

For instance, referring to FIGS. 3a and 3b, a sample isolate 302 (e.g., a biological cell or a soft particle) is trapped by an optical tweezer (e.g., the optical tweezer system 102) near the focused beam volume 304, and meanwhile dragged and stretched by a microfluidic flow 306 (e.g., provided by the microfluidic flow system 104) along the flow direction (the x direction) transverse to the beam (the z direction). The beam is periodically blocked (e.g., using a modulation signal 310) to allow the stretched cell or particle to escape from the optical tweezer.

In the exemplary embodiment of FIGS. 3a-c, the isolate samples are osmotically swollen red blood cells (RBCs). However, other types of isolate samples are also contemplated within the scope of the present application. An optical tweezer (e.g., from the optical tweezer system 102) is used to trap the isolate sample 302 near the focused Gaussian beam volume 304, and a microfluidic flow 306 is used to drag and stretch the trapped isolate sample 302 along the flow direction (the x direction) transverse to the beam 304 (the z direction). At a dynamic equilibrium, the stretched isolate sample 302 may experience balanced optical gradient and fluidic forces.

Additionally, and/or alternatively, the processor 110 uses a modulation signal 310 periodically to block the beam 304 (at a ~Hz frequency) to allow the stretched isolate sample 302 to escape from the optical tweezer and move away with the flow when the beam 304 is blocked. The fluidic flow 306 delivers the isolate samples 302 continuously toward the tweezer and also stretches the trapped isolate samples 302. In order to avoid any physical contacts between the isolate sample 302 under test and solid surfaces (e.g., the walls 308 of the microfluidic channel 114), the optical tweezer traps the isolate sample 302 above the substrate and away from the microfluidic channel walls 308 such that the cells are trapped at a position away from any solid surfaces.

Referring to FIG. 3c, a stiffer (unhealthy) sample isolate 302 (e.g., cell 2) exhibits a smaller shape deformation (e.g., a smaller change in the $d_x/d_y$ ratio) than a normal (healthy) isolate sample 302 (e.g., cell 1) under the same test condition (e.g., microfluidic flow 306). The optofluidic system 100 uses the image processing system 308 (e.g., a conventional optical microscopy with a bright-field imaging system) to record top-view images of the sample isolates 302 through the top surface of the microfluidic channel 114. The image processing system 308 includes a long-working-distance microscope objective lens 314 and a digital charge-coupled-device (CCD) camera 312. The recorded videos and images are analyzed using an image processing program 316, which may be executed by the processor 110. In other words, the processor 110 receives the recorded videos and/or images from the camera 312. The processor 110 then analyzes the recorded videos and/or images to determine deformation characteristics by executing instructions the non-transitory memory 116.

The shape deformation (e.g., deformation characteristics) of a sample isolate 302 (e.g., cell) upon a stretching force depends on its stiffness or elasticity. Under the same force, a stiffer cell (cell 2 from FIG. 3c) exhibits a smaller shape deformation than that of a cell with less stiffness (cell 1 from FIG. 3c). Therefore, through inspecting the shape deformation of cells under a given stretching force, the processor 110 is able to distinguish between healthy (elastic) and diseased (less elastic) cells when the mechanical properties are affected by the disease condition.

In order to quantify the shape deformation of cells, the processor 110 measures, from the top-view images, the cell dimensions along the flow direction (the x direction) and transverse to the flow direction (the y direction), labeled as $d_x$ and $d_y$, respectively. The processor 110 extracts/determines the $d_x/d_y$ ratio to represent the cell shape. An osmotically swollen spherical cell before stretching may have a $d_x/d_y$ ratio of unity. A stretched cell along the flow direction may have a $d_x/d_y$ ratio of exceeding unity. Given the cells are not ideally spherical before stretching, the processor 110 normalizes the $d_x/d_y$ ratio during and after the stretching with the ratio before the stretching.

In some variations, the processor 110 may use a more quantitative data analysis to determine the deformations of the sample isolates (e.g., assuming a linear spring model and the fluidic force dominating the cell stretching may allow for an estimate to a first-order approximation the cell's elasticity (by measuring the change in $d_x$ under an estimated fluidic drag force)). This is explained further in U.S. Provisional Patent Application No. 62/954,047, filed Dec. 27, 2019, which is incorporated by reference herein in its entirety.

Microfluidic Channel Fabrication

Figure 4B:
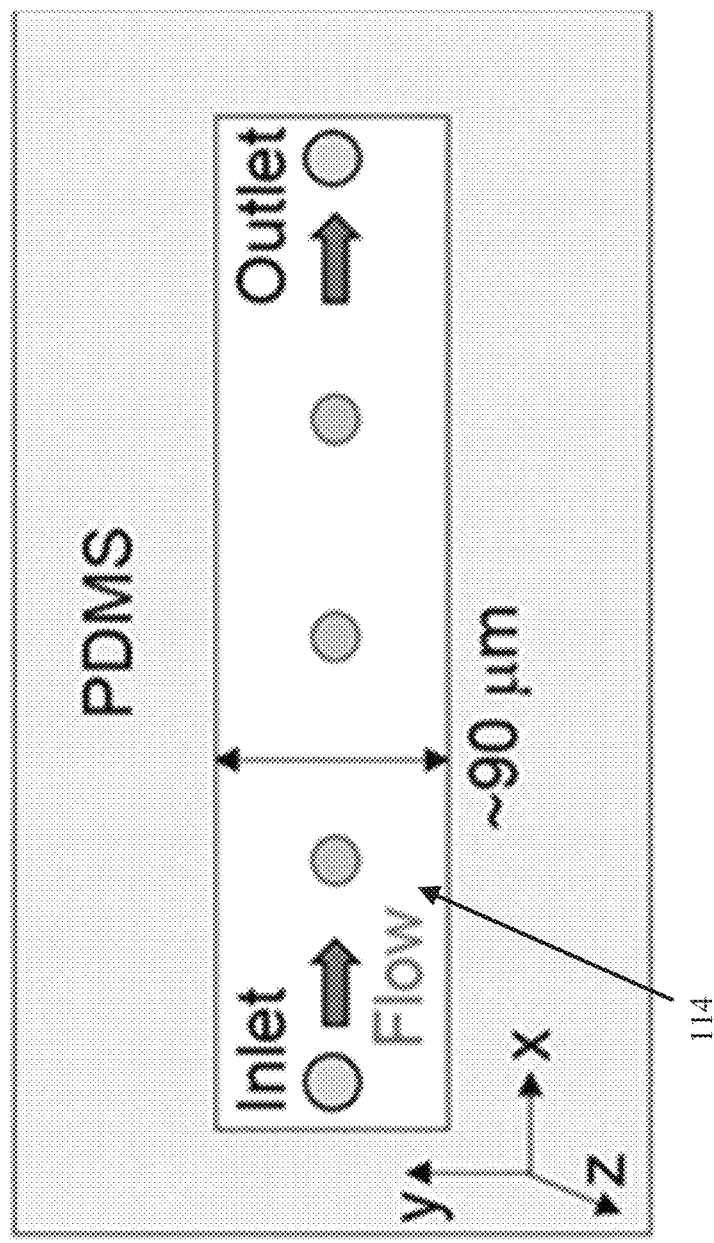

FIG. 4a shows a cross-sectional view and FIG. 4b shows a top view of a fabricated microfluidic chip 114 with an inlet and an outlet for continuous sample isolate 302 delivery, collection, and/or imaging. For example, the microfluidic channels 114 may be fabricated using a standard soft-lithography technique. For instance, the microfluidic channel patterns may be fabricated on a silicon chip using contact photolithography and deep reactive-ion etching (DRIE). The patterned silicon chip may be used as a mold to transfer the pattern to a polydimethylsiloxane (PDMS) layer with a thickness of approximately 3 millimeters (mm). After peeling off the PDMS from the silicon mold, a puncher may be used to make an inlet and an outlet at the two ends of the microfluidic channel 114 in the PDMS layer, each with a diameter of approximately 1 mm.

The patterned PDMS layer is bonded to a thin cover glass slide to make the microfluidic channels 114. The PDMS layer and the glass slide are treated with oxygen plasma before bonding them together. The bonded PDMS-glass interface may be stable enough under different flow pumping rates varying from 1 microliter/hour (μl/hr) to 3 μl/hr.

In an exemplary embodiment, a PDMS microfluidic channel 114 with a width of approximately 90 μm and a height of approximately 40 μm is used. However, other dimensions of microfluidic channels 114 are contemplated within the present application.

Example Setup

Figure 4C:
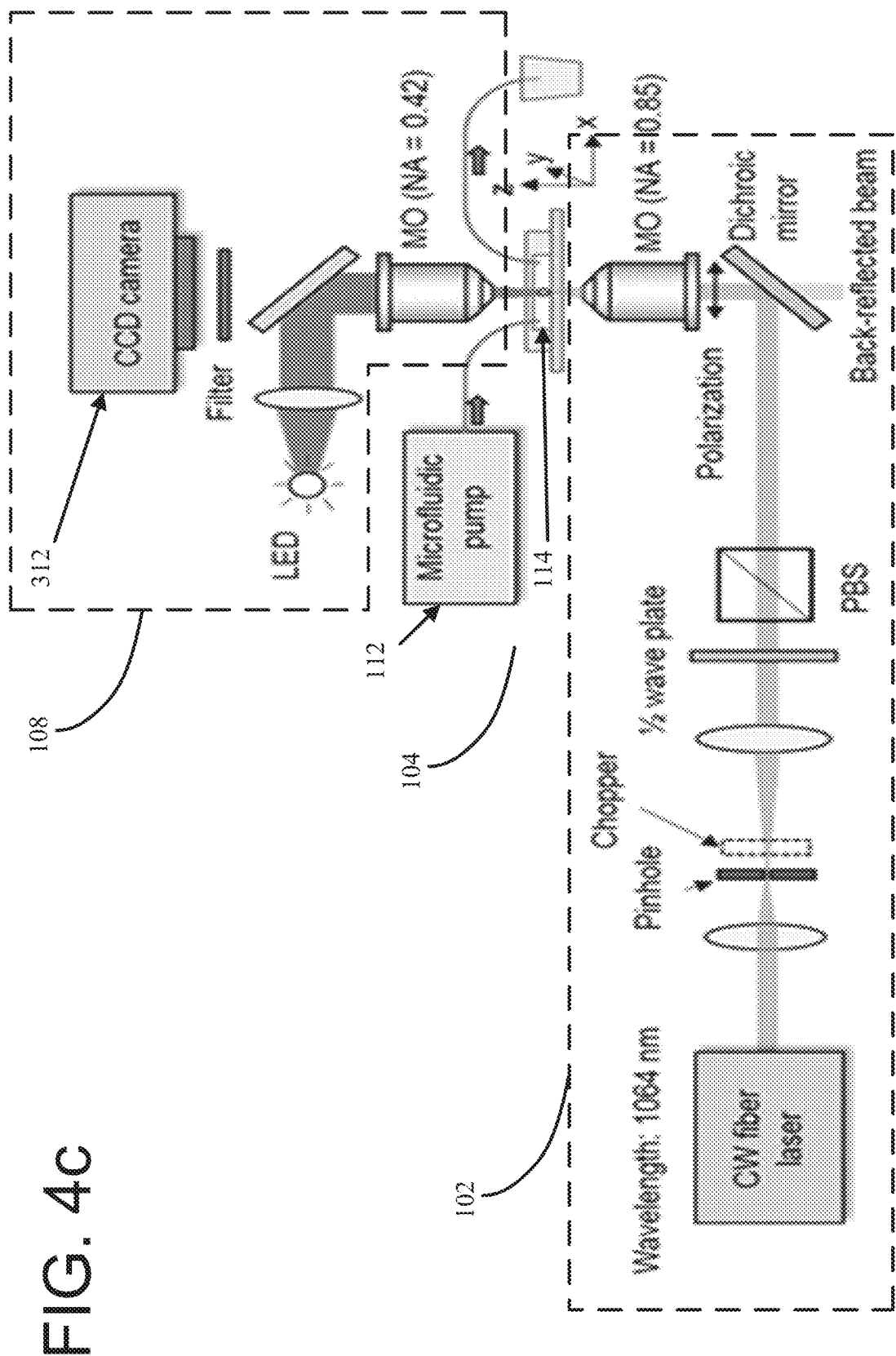
FIG. 4c shows an exemplary system (e.g., exemplary components/devices) of the optical tweezer system, the microfluidic flow system, and the image processing system.

FIG. 4c shows an exemplary system (e.g., exemplary components/devices) of the optical tweezer system 102, the microfluidic flow system 104, and the image processing system 108. For example, the optical tweezer system 102 includes a 1064 nanometer (nm)-wavelength cw fiber laser as the light source. This wavelength is compatible with biological applications, with minimal photo-damage to biological cells (the cells are transparent to the 1064 nm wavelength) and minimal absorption in water ($\alpha$=0.61 cm$^{-1}$) such that the laser beam is not heating up the fluidic medium. However, other wavelengths that fit the above criteria may also be used. The processor 110 controls the linearly polarized laser power using a rotatable half-wave plate and a fixed polarizing beam splitter (PBS).

The exemplary system uses a microscope objective (MO) lens with a high numerical aperture (NA) of approximately (~) 0.85 in air to focus the laser beam into the microfluidic channel 114. For the exemplary system, the focused beam waist diameter inside the fluidic medium is estimated to be ~1.1 μm and the depth of focus to be ~2.6 μm. The beam waist position is calibrated relative to the channel substrate from the back-reflected beam divergence from the glass-fluid interface. The optical tweezer is positioned above the substrate at a distance of ~6 μm to avoid the trapped sample isolate 302 (with a typical diameter of ~7 μm) from making contacts with the substrate.

A mechanical chopper is used to periodically block the laser to allow the stretched cell to escape from the tweezer after reaching the dynamic equilibrium state for a continuous characterization of multiple incoming cells carried by the flow. In other words, the processor 110 provides the modulation signal 308 to a modulation device (e.g., a control mechanism of the mechanical chopper) to periodically block the laser. The chopping frequency used is ~2 Hz (corresponding to a laser exposure time of ~0.25 s) to allow a sufficiently long time for trapping and stretching the cell. In some instances, the processor 110 tunes and optimizes the chopping frequency to stretch the cells to a state that allows statistically the most sensitive differentiation between different cell elasticity.

The processor 110 images the isolate samples in the microfluidic channel 114 using a long-working-distance microscope objective (MO) lens with an NA of 0.42 onto a digital CCD camera. The camera records the images of the isolate samples at a frame rate of ~80 fps with a reduced field-of-view of ~35 μm×~35 μm.

The inlet of the microfluidic channel 114 is connected with a syringe pump using a tubing. The flow speed is controlled in the channel 114 by controlling the pumping rate of the pump 112. Another tubing is used to connect the outlet of the channel 114 with a plastic tumbler for waste collection.

Cell Sample Preparation

Rabbit blood samples of ~5 mL were used in a test. Each blood sample was added with ~10% heparin for anti-coagulation. The blood in a ~0.6× phosphate-buffered saline (PBS) buffer solution was diluted to osmotically swell the RBCs with an estimated cell concentration of ~$10^8$ cells/ml. The RBCs were incubated in the buffer solution for ~10 minutes (mins) before the experiments. For chemical treatment of cells, the RBCs were incubated in a ~0.6× PBS buffer solutions with a glutaraldehyde v/v concentration of ~0.002%. The dependence of the shape deformation and the cell elasticity on the concentration of the chemical treatment as well as extracting the sensitivity of the cell stretcher is explained further in U.S. Provisional Patent Application No. 62/954,047, filed Dec. 27, 2019, which is incorporated by reference herein in its entirety.

Image Processing

The processor 110 is used to process all the frame images from videos recorded by the image processing system 108 (e.g., the CCD camera 312). The processor 110 may use the Image Processing Toolbox and the Computer Vision System Toolbox in the MATLAB to process the frame images. The image processing mainly comprises three steps, including (i) edge detection, (ii) object segmentation, and (iii) feature extraction.

In the edge detection, the processor 110 calculates the gradient images from the recorded top-view images of cells and applies an adaptive threshold to create a binary mask that contains the edge profile of the cell. In the object segmentation, the processor 110 obtains from the binary mask the cell edge profile and removes irrelevant edges. In the feature extraction, the processor 110 measures the centroid position, the speed, and size of cells based on the extracted cell profiles.

Using the extracted positions of the cells in each frame, the processor 110 tracks the cell trajectories and measures the speeds of the cells when the cells are passing through the field of view of ~35 μm×~35 μm. The processor 110 extracts and plots the $d_x$, $d_y$, and $d_x/d_y$ ratio as a function of the x location of the centroid position to show the variation of the cell deformation when the cells are passing through the field of view.

Optical Tweezing of Cells in a Microfluidic Flow

Figure 5A:
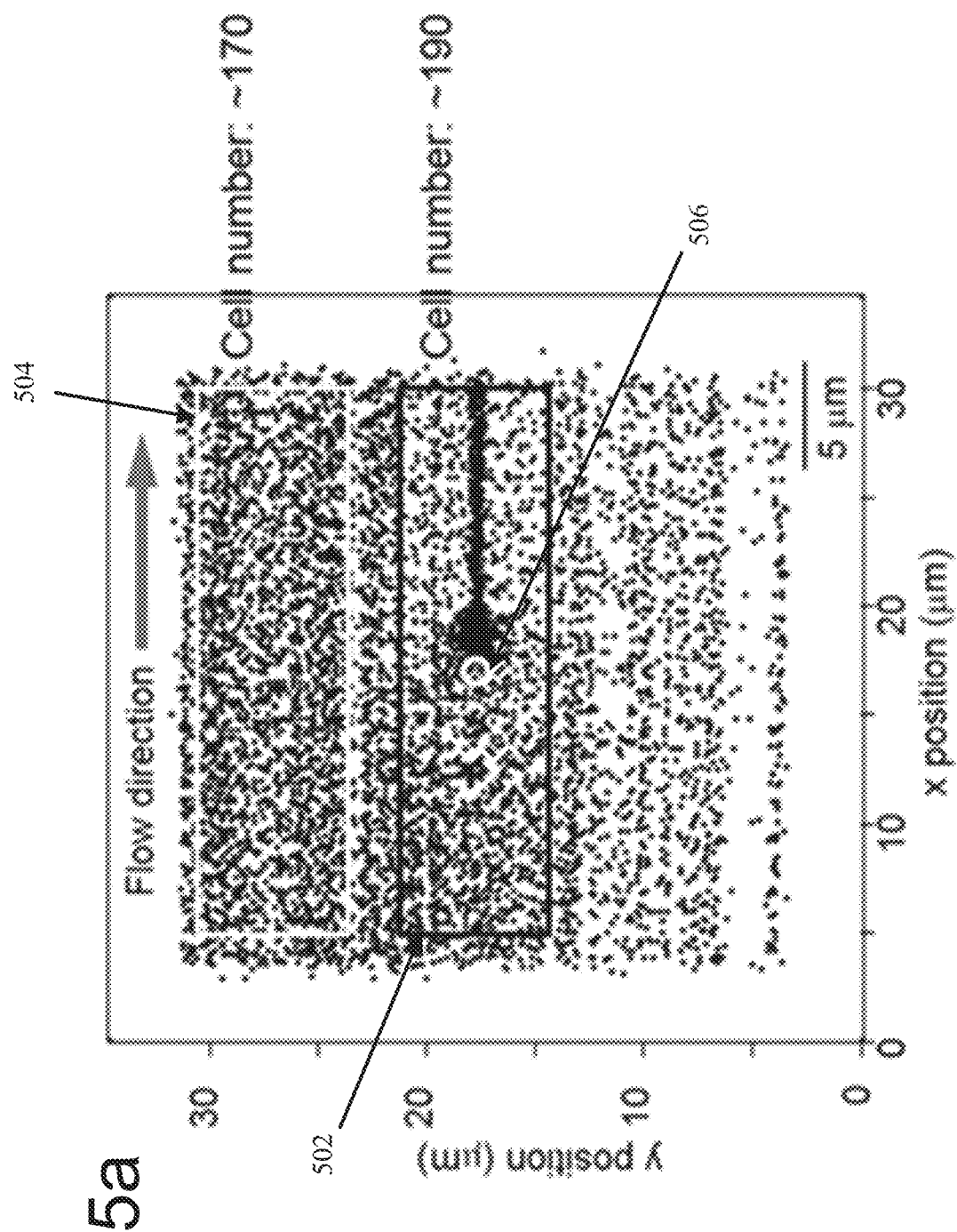
FIG. 5a shows extracted trajectories of multiple sample isolates (e.g., osmotically swollen rabbit RBCs) streaming through the field of view of the image processing system.

FIG. 5a shows a frame of a video from which trajectories of multiple sample isolates (e.g., osmotically swollen rabbit RBCs) streaming through the field of view of the image processing system 108 are extracted. For example, the multiple osmotically swollen rabbit RBCs are streaming through the field of view at a flow rate of ~2.5 μl/hr from a ~78 s video. The x-y position of the optical tweezer is labeled using a white circle 506. The optical tweezer is positioned at x=~17 μm and y=~18 μm, at an estimated optical power of ~45 mW. The estimated optical intensity is ~$10^6$ W/cm$^2$ given the estimated beam waist diameter is ~1.1 μm. In some instances, the optofluidic system 100 uses a lower optical power with a reduced flow rate.

A region of interest is defined with dimensions of ~6 μm (y)×~25 μm (x), indicated using a black-line box 502, where the incoming cells overlap with the tweezer when passing through the field of view. There are a total number of N≈190 cells passing through the region of interest. Among them, a number of N'≈90 cells are attracted toward and momentarily trapped at the tweezer, and subsequently escape along a line in the flow direction. This phenomenon is attributed to that the cells are attracted and trapped by the optical gradient force only when the laser is on (~250 ms), and the cells pass through the region of interest without trapping when the laser is blocked (~250 ms).

For comparison, cells outside the region of interest (with no spatial overlap with the tweezer), indicated using a white-line box 504, are observed to keep moving along the flow without being affected by the optical tweezer.

The processor 110 may use the image processing system 108 to extract the speed of the cells passing through the field of view (e.g., via a video). FIG. 5b shows the scatter plot of the cell speed as a function of the x location within the region of interest indicated by box 502). The curve 508 shows the average value of the cell speed. The semi-transparent column 510 labels the x position of the tweezer. The total cell number N within the region of interest and the number of tweezed cells N' is labeled as (N, N').

Using FIG. 5b, the cells are observed to have an average incoming speed of ~120 μm/s. The tweezer attracts and traps the cells at a position of x=~19 μm, where the average cell speed drops to nearly zero.

For x=~19 μm, the cell speed rises from nearly zero to ~150 μm/s upon releasing the stretched cells and an acceleration enabled by the flow. The average speed of the released cells after acceleration is higher than the incoming speed of ~120 μm/s. This phenomenon may be attributed to the fact that the cells are slightly levitated and trapped by the tweezer at a plane higher than their incoming plane (which is close to the substrate due to gravity). When the cells are released, they experience a higher flow speed than that close to the substrate upon a laminar flow distribution (with the maximum flow speed near the channel center).

FIG. 5c shows the scatter plot of the cell speed as a function of the x location of cells in a region outside the region of interest, as indicated using a white-line box 504 from FIG. 5a. A uniform distribution of the cell speed with an average value of ~120 μm/s is observed, indicating the cell speed outside the region of interest is not affected by the tweezer.

Stretching of Trapped Cells Using the Microfluidic Flow

Figure 6A:
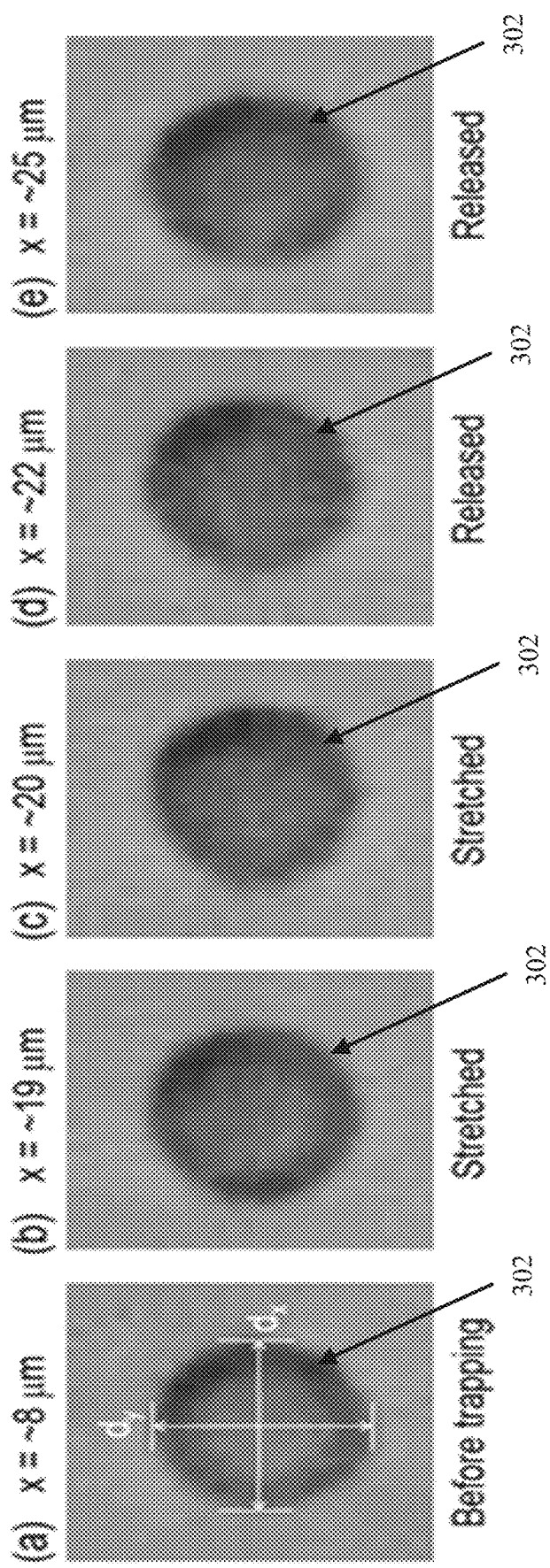
FIG. 6a shows optical micrographs of representative sample isolates (e.g., cells) passing through the region of interest.
Figure 6B:
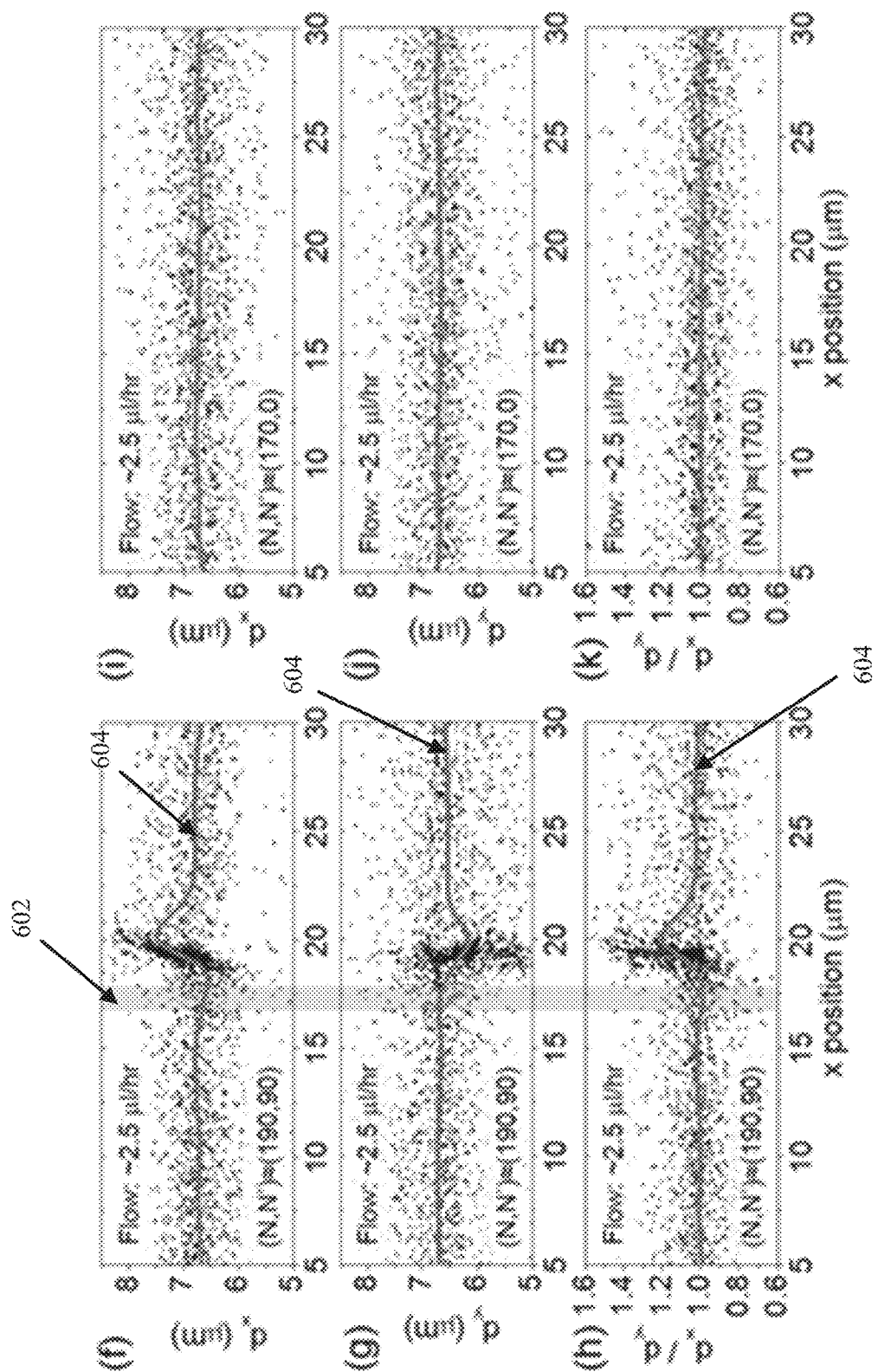
FIG. 6b show $d_x$, $d_y$, and the $d_x/d_y$ ratio as a function of the x position of the cells in a region of interest and outside the region of interest.

FIG. 6a shows optical micrographs of representative sample isolates (e.g., cells) passing through the region of interest. FIG. 6b shows $d_x$, $d_y$, and the $d_x/d_y$ ratio as a function of the x position of the cells in the region of interest and outside of the region of interested indicated using the black-line box 502 and white-line box 504 from FIG. 5a.

For example, FIG. 6a shows the optical micrographs of a representative sample isolate 302 (e.g., cell) passing though the region of interest. Before trapping, the cell exhibits a nearly symmetrical shape due to osmotic swelling, as shown in Part (a) of FIG. 6a. During stretching, the cell is elongated along the flow direction (the x direction) due to the fluidic drag force, as shown in Parts (b) and (c) of FIG. 6a. After the cell is released from the tweezer, the cell gradually recovers to the nearly symmetrical shape, as shown in Parts (d) and (e) of FIG. 6a. The lengths of the cell along the flow direction (the x direction) and transverse to the flow direction (the y direction), namely $d_x$ and $d_y$, are labeled in Part (a) of FIG. 6a.

The $d_x$, $d_y$, and $d_x/d_y$ ratio of the cells in the region of interest, as indicated in the black-line box 502 from FIG. 5a, are extracted. For example, Parts (f), (g), and (h) of FIG. 6b show the scatter plots of the extracted $d_x$, $d_y$, and $d_x/d_y$ ratio as a function of the x position of the sample isolates. In each of the scatter plots, the processor 110 obtains/determines the average value, as shown by the curve 604 in each of Parts (f), (g), and (h). The position of the tweezer is shown using a semi-transparent column 602 across the Parts (f), (g), and (h) of FIG. 6b.

Before the incoming cells reaches the tweezer at x=~17 μm, the average $d_x$ and $d_y$ values of cells are both ~6.7 μm (e.g., for x<13 μm), as shown in Parts (f) and (g) of FIG. 6b, respectively. Correspondingly, the average $d_x/d_y$ ratio of the incoming cells is ~1.0 (for x<13 μm), as shown in Part (h) of FIG. 6b. These results suggest that the cell shape before trapping is nearly spherical (osmotically swollen) before the cells interact with the tweezer.

The cells trapped at a position of x=~19 μm are stretched and deformed by the microfluidic flow. For example, when a cell is tweezed by the optical tweezer system 102, the cell is then dragged by the flow along the flow direction, which deviates the cell from the tweezer position. This leads to a displacement of approximately 2 μm between the centroid position of the cell (e.g., x=~19 μm) and the tweezer position (e.g., x=~17 μm). The average $d_x$ increases, whereas the average $d_y$ drops, as shown in FIGS. 6f and 6g, respectively, showing the cells are elongated along the x direction, but compressed in the y direction. At x=~20 μm, reaches the maximum of ~7.5 μm ($\Delta d_x$~0.8 μm) and $d_y$ reaches the minimum of ~6.1 μm ($\Delta d_y$~−0.6 μm). Correspondingly, the $d_x/d_y$ ratio reaches the maximum of ~1.2 μm at the maximum deformation.

After the cells are released from the tweezer, the average $d_x$ recovers to ~6.8 μm and the average $d_y$ recovers to ~6.6 μm, within ~2 μm of displacement. Correspondingly, the $d_x/d_y$ ratio recovers to ~1.0, suggesting the cell shape recovers to the nearly spherical shape after the tweeze-and-drag process.

The fluidic force F exerted on the trapped cells are estimated to be in the ~pico newton (pN) level using a first-order approximation based on the Stokes' law: $F=6\pi\eta Rv$, where $\eta$ (~$10^{-3}$ Nm$^{-2}$·s) is the dynamic viscosity of PBS solution, R (~3.4 μm) is the cell radius, and v (~150 μm/s) is the relative speed between the cells and the flow. Assuming a linear spring model, the spring constant of the RBCs is estimated to be in the order of ~μN/m, given the change of the cell $d_x$ is ~1 μm.

Throughout the test (e.g., ~78 s video), there are N'~90 cells tweezed and dragged, corresponding to an average cell stretching throughput of ~1.2 cells/s.

For comparison, the $d_x$, $d_y$, and $d_x/d_y$ ratio of the cells outside the region of interest, as indicated in the white-line box 504 from FIG. 5a are extracted. Parts (i), (j), and (k) of FIG. 6b show the extracted $d_x$, $d_y$, and $d_x/d_y$ ratio of cells (N~170) as a function of the x position of the cells. Parts (i) and (j) of FIG. 6b show the $d_x$ and $d_y$ are both uniform along the x position, with an average value of ~6.7 μm. Part (k) of FIG. 6b shows the $d_x/d_y$ ratio is uniform along the x position, with an average value of ~1.0, suggesting there is no significant shape deformation for cells that are not interacting with the tweezer.

Figure 7:
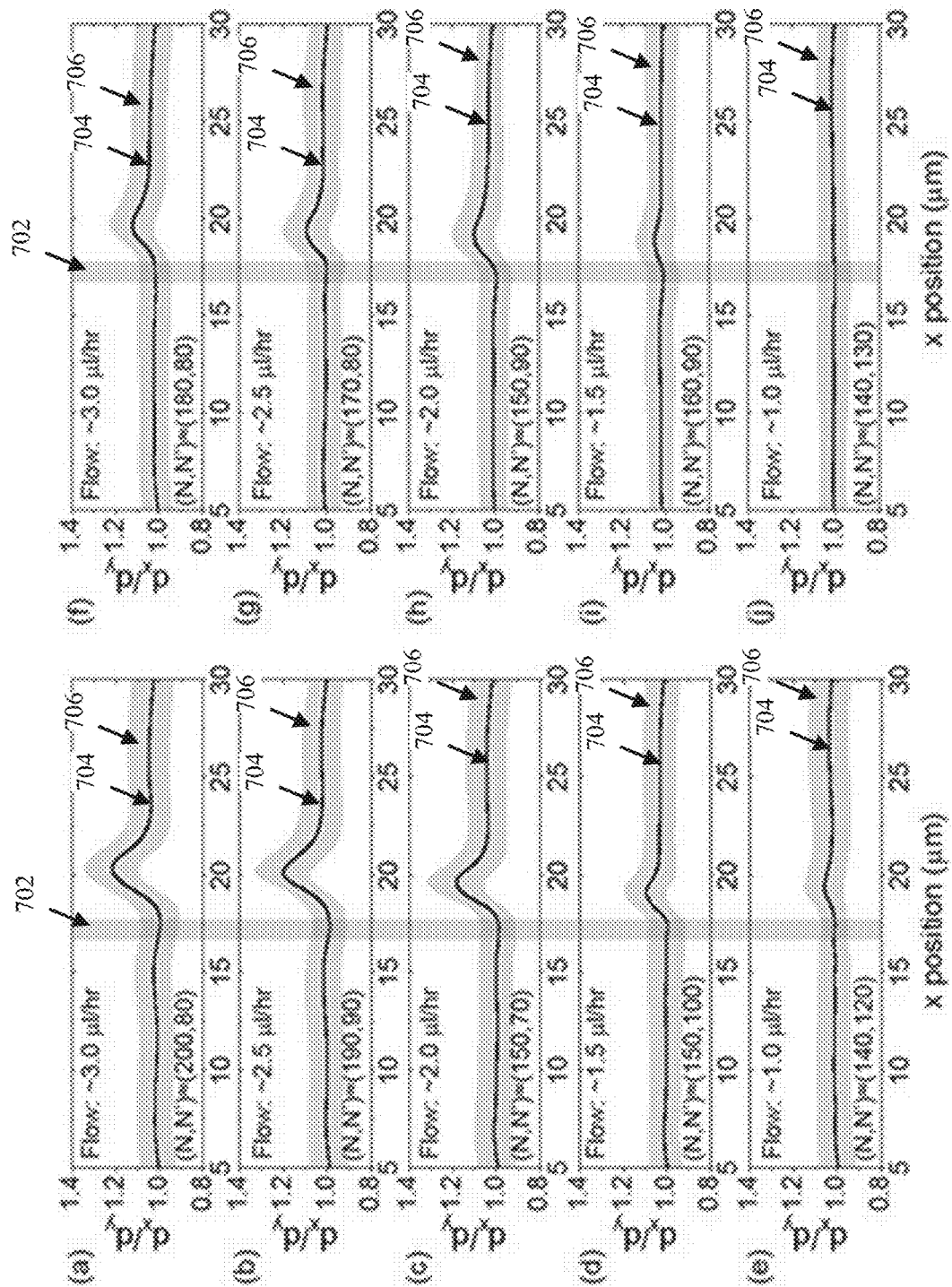
FIG. 7 shows extracted $d_x/d_y$ ratios of the untreated and treated cells as a function of the x position of the cells at different flow rates.

Distinguishing Healthy (Untreated) and Unhealthy (Chemically Treated) Sample Isolates FIG. 7 shows extracted $d_x/d_y$ ratios of the untreated cells (e.g., simulated healthy cells) as a function of the x position of the cells and extracted $d_x/d_y$ ratio of the cells treated with glutaraldehyde (e.g., simulated unhealthy cells) as a function of the x position of the cells at different flow rates from ~3.0 μl/hr to ~1.0 μl/hr. The position of the tweezer is indicated using a semi-transparent column 702. The total cell number N and the number of tweezed cells N' are labeled as (N, N').

In accordance with process 200 and/or system 100, the processor 110 extracts (e.g., determines) $d_x/d_y$ ratios of the untreated cells (e.g., simulated healthy cells) and/or the $d_x/d_y$ ratio of the cells treated with glutaraldehyde (e.g., simulated unhealthy cells). For example, the osmotically swollen RBCs are measured without and with chemical treatments for cell stiffness modification. For chemical treatments of cells, the swollen RBCs are treated with ~0.002% v/v concentration of glutaraldehyde. The glutaraldehyde has been known to be able to cross-link cellular proteins, and thus increase the cell stiffness.

The swollen RBCs are characterized, both without and with glutaraldehyde treatments, at different flow rates varying from ~3.0 μl/hr to ~1.0 μl/hr. The $d_x/d_y$ ratio of the cells in the region of interest for each test condition are extracted. Parts (a)-(j) of FIG. 7 show the comparison between the $d_x/d_y$ ratio of the untreated and chemical-treated RBCs at different flow rates. The processor 110 calculates the average values of the $d_x/d_y$ ratios from multiple cells, as shown using the black curves 704. The processor 110 also calculates the standard errors 706, which are denoted using the grey shadows around the black curves 704. For each of the Parts (a)-(j), the total cell number N and the number of tweezed cells N' are labelled as (N, N').

The average $d_x/d_y$ ratios of the incoming cells are ~1.0 under all the test conditions, suggesting there is no significant effect on the cell shapes from either the flow speed or the chemical treatment before the cells reaching the tweezer. Increases of the average $d_x/d_y$ ratios upon most of the test conditions (other than Part (j)) when the cells are stretched are recognized in Parts (a)-(j). After the cells are released from the optical tweezer, the average $d_x/d_y$ ratios recover to ~1.0 wider all the test conditions, suggesting the cell shape recovers to the nearly spherical profile.

Figure 8:
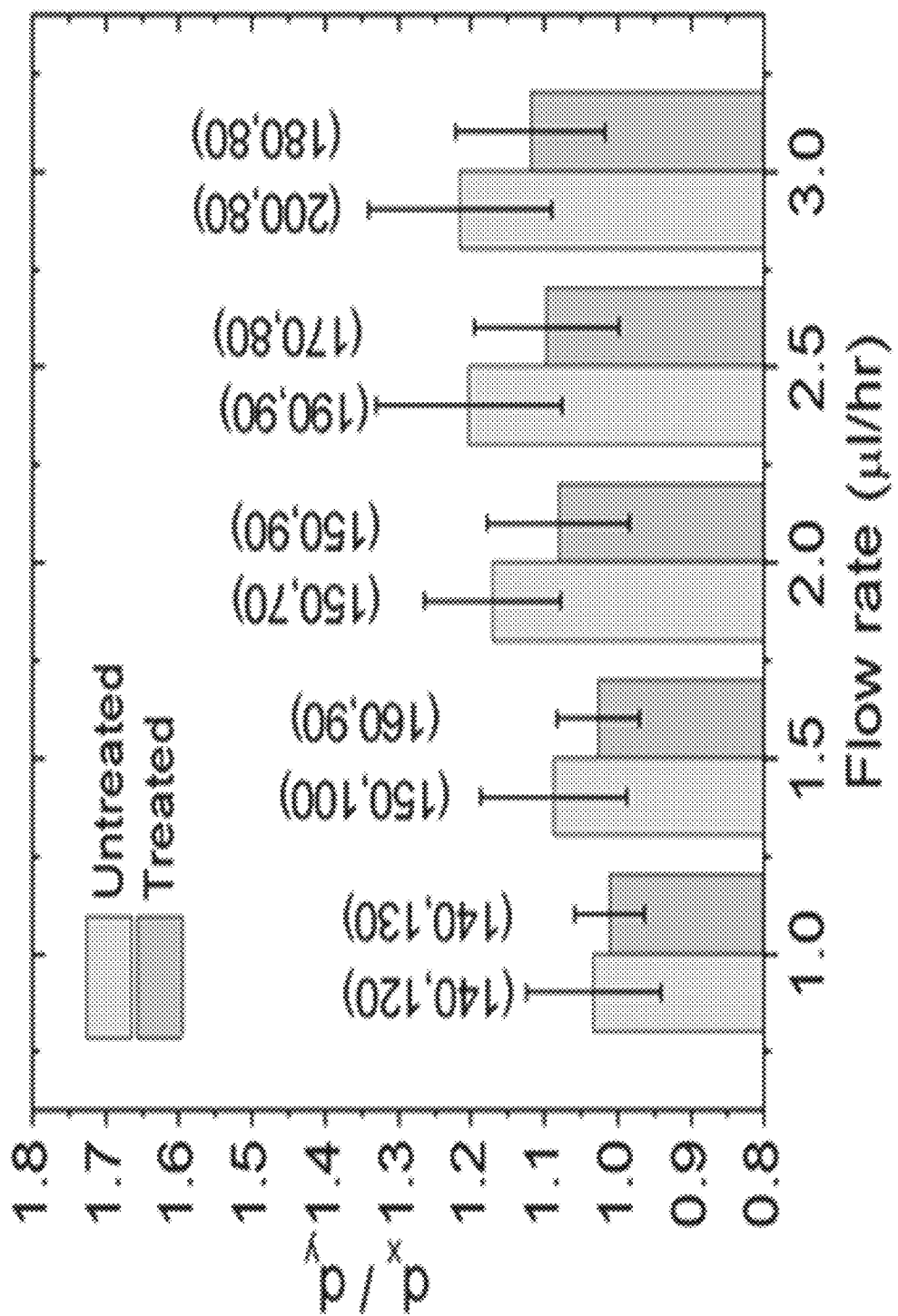
FIG. 8 shows a comparison of the extracted maximum $d_x/d_y$ ratios of the untreated and chemical-treated RBCs at different flow rates.

FIG. 8 shows a comparison of the extracted maximum $d_x/d_y$ ratios of the untreated and chemical-treated RBCs at different flow rates. The total cell number N and the number of tweezed cells N' are labeled as (N, N'). For both the untreated and chemical-treated cells, the maximum $d_x/d_y$ ratio increases with the flow rate. This is attributed to the fact that the trapped cells experience a larger stretching force upon a higher-speed flow. Under all the flow rates, the chemically treated cells generally exhibit a less deformation than the untreated cells, which is consistent with cell stiffening due to the chemical treatment. The dependence of the cell deformation on the chemical treatment concentrations and establishing a sensitivity of the stretcher to the chemical treatment is explained further in U.S. Provisional Patent Application No. 62/954,047, filed Dec. 27, 2019, which is incorporated by reference herein in its entirety.

Figure 9:
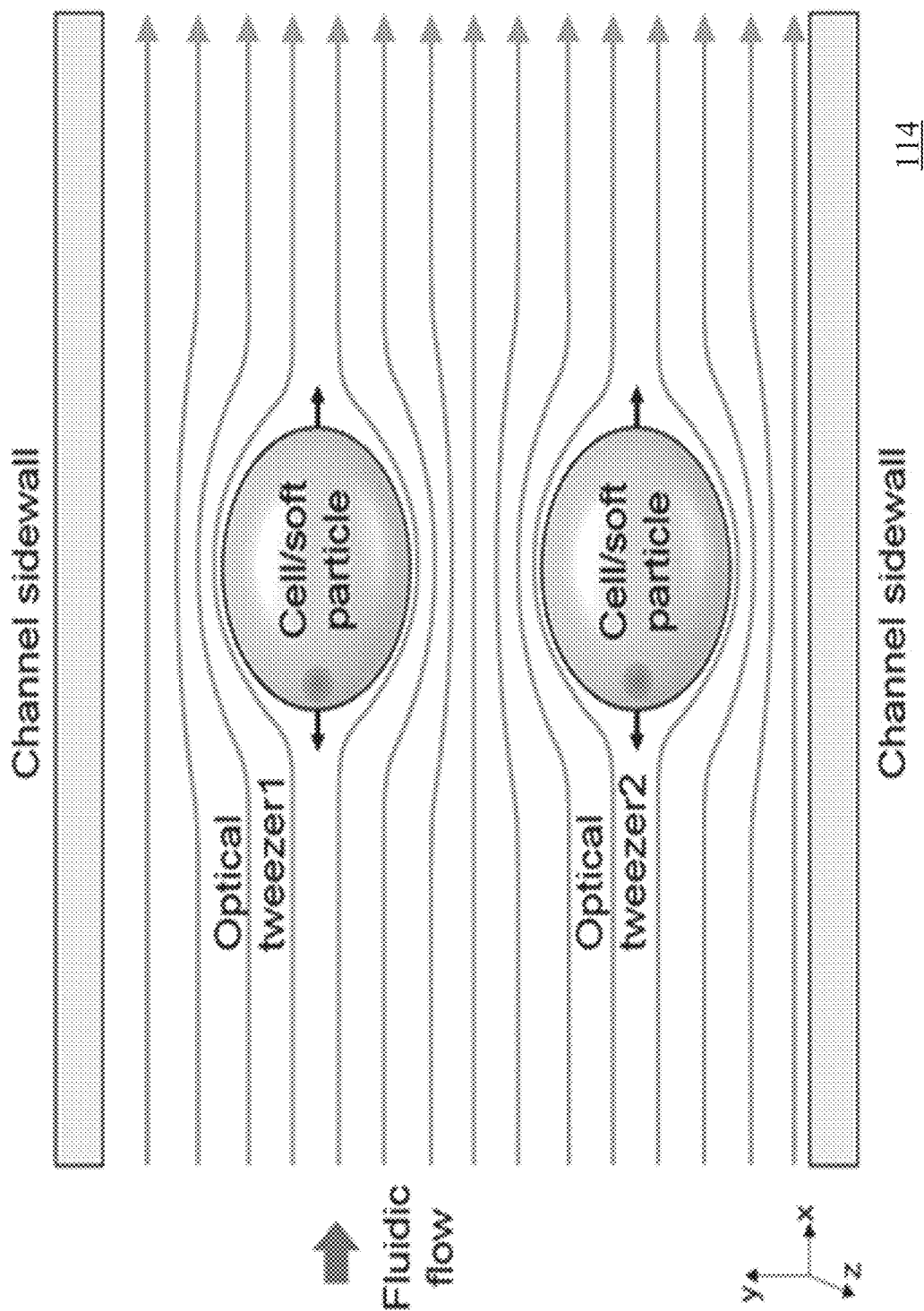
FIG. 9 shows a microfluidic channel with two optical tweezers for two parallel tweeze-and-drag processes.

In some instances, the optofluidic system 100 uses two or more optical tweezers (e.g., two or more beams). For example, FIG. 9 shows a microfluidic channel 114 with two optical tweezers for two parallel tweeze-and-drag processes. In other words, referring to FIG. 1, the optical tweezer system 102 includes two optical tweezer devices that generate two optical tweezers. Referring to block 202, the processor 110 traps the sample isolates using the two optical tweezers (e.g., two beams). For example, the two optical tweezers are positioned with a large enough separation in the direction transverse to the flow direction, such that they can independently and simultaneously tweeze two cells or particles and enable two independent tweeze-and-drag process with the same microfluidic flow. In such instances, the processor 110 enables approximately a 2 times characterization throughput compared to using a single optical tweezer.

Figure 10:
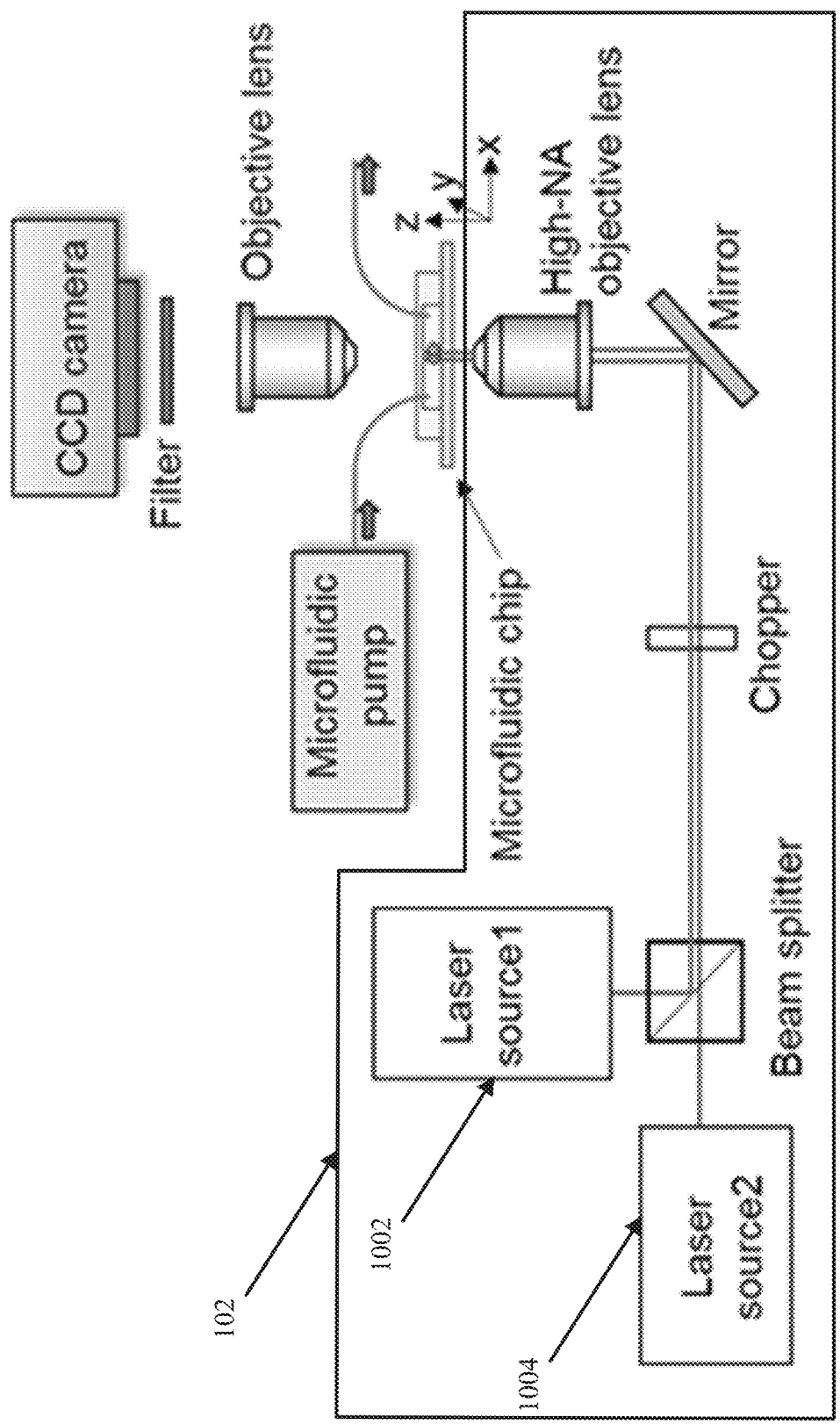
FIG. 10 shows an optofluidic system with an optical tweezer system that includes two optical tweezer devices.

FIG. 10 shows an optofluidic system 100 with an optical tweezer system 102 that includes two optical tweezer devices (e.g., two separate laser sources 1002 and 1004) to generate two optical tweezers in the microfluidic channel. The separate laser sources 1002, 1004 may or may not have identical output powers or wavelengths. The separate laser sources 1002, 1004 generate two optical tweezers inside the microfluidic channel after the two laser beams are focused simultaneously using the same high-NA microscope objective lens. In some examples, the optofluidic system 100 includes additional optical tweezer devices (e.g., three or more separate laser sources).

Figure 11:
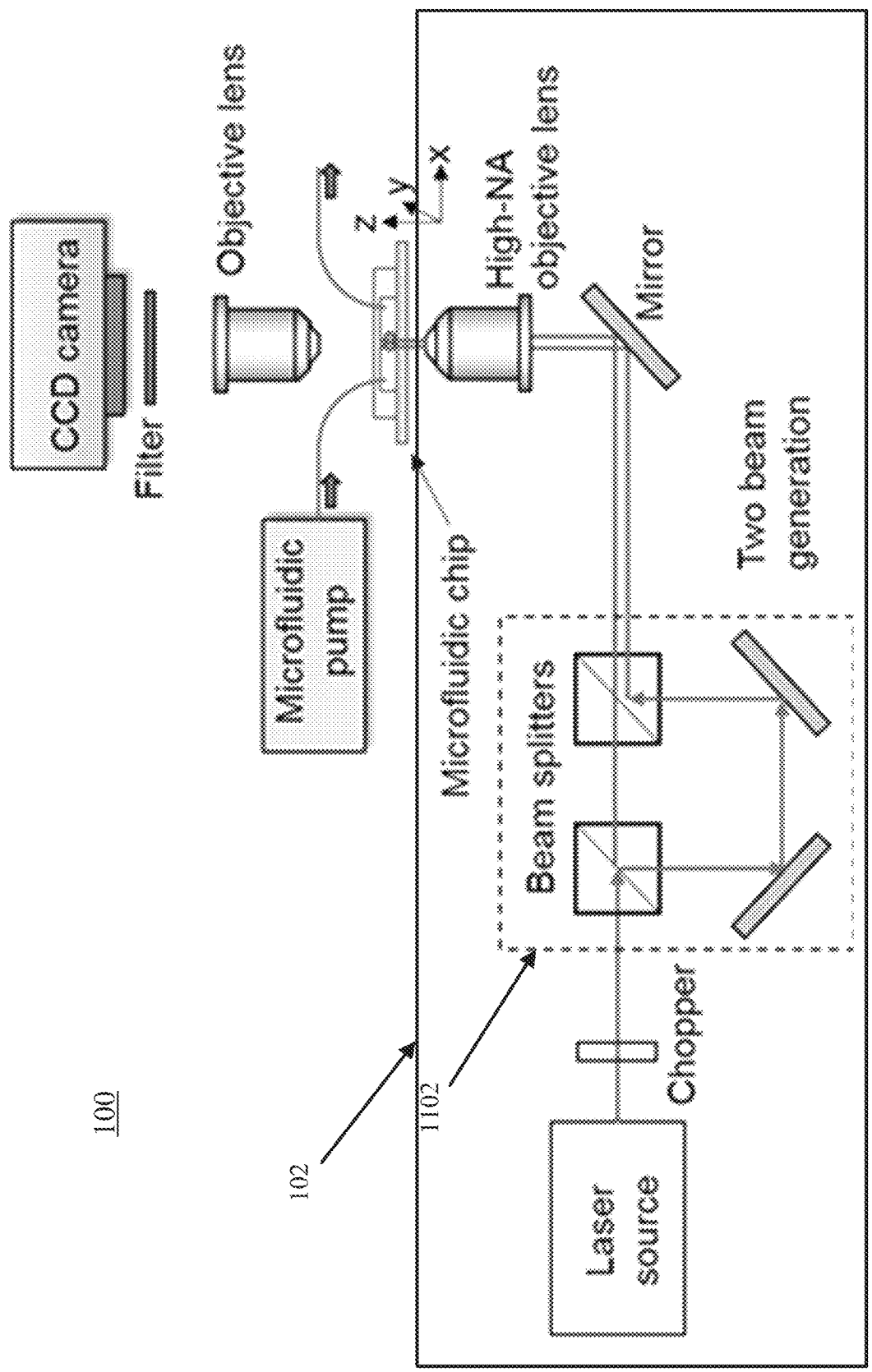
FIG. 11 shows another optofluidic system with an optical tweezer system that generates two optical tweezers in the microfluidic channel.

FIG. 11 shows another optofluidic system 100 with an optical tweezer system 102 that generates two optical tweezers in the microfluidic channel. For example, the optofluidic system 100 uses a single laser source and an interferometer system 1102 comprising two optical beam splitters and two mirrors to separate the input laser beam into two displaced, parallel propagating laser beams. This generates two optical tweezers inside the microfluidic channel after the two laser beams are focused simultaneously using the same high-NA microscope objective lens.

Figure 12A:
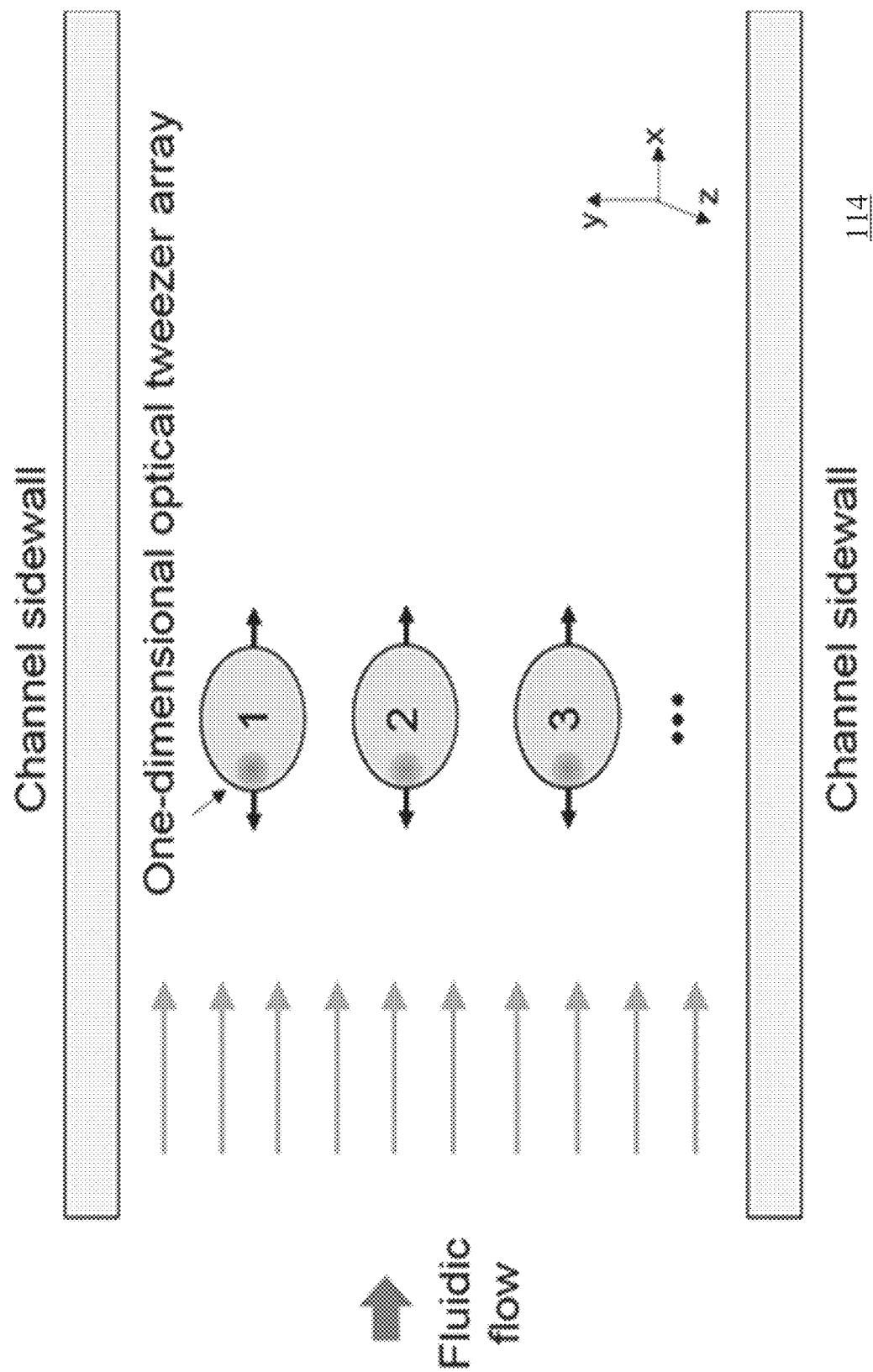
FIGS. 12a and 12b show a microfluidic channel with one-dimensional and two-dimensional optical tweezer arrays for multiple parallel tweeze-and-drag processes.
Figure 12B:
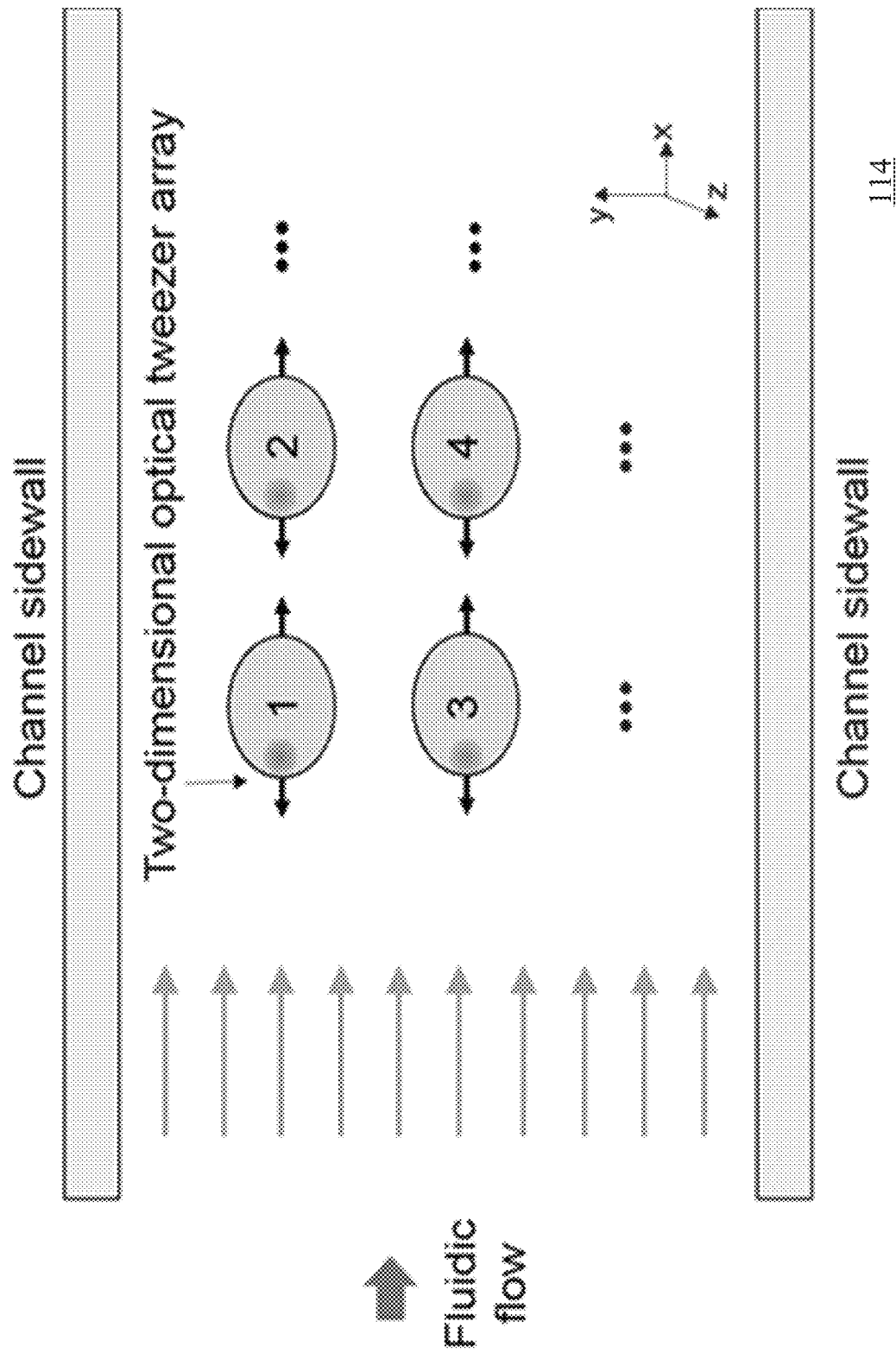

In some variations, the optofluidic system 100 uses two or more optical tweezers (e.g., two or more beams) in a first and/or a second dimension. For example, FIGS. 12a and 12b show a microfluidic channel 114 with one-dimensional and two-dimensional optical tweezer arrays for multiple parallel tweeze-and-drag processes. In other words, referring to block 202, the processor 110 traps the sample isolates using one-dimensional and two-dimensional optical tweezer arrays. The optical tweezer array comprises multiple optical tweezers, which may be arrayed in a one-dimensional 1×N optical lattice (shown in FIG. 12a), a two-dimensional N×M rectangular optical lattice (shown in FIG. 12b), a two-dimensional hexagonal optical lattice, and so on. When multiple cells or particles enter into the array region, the arrayed tweezers in the microfluidic flow may simultaneously and independently enable the tweeze-and-drag process, assuming the tweezers are sufficiently spaced apart. In such instances, the optofluidic system 100 enables significantly enhanced characterization throughput, depending on the number of optical tweezers in the array.

Figure 13:
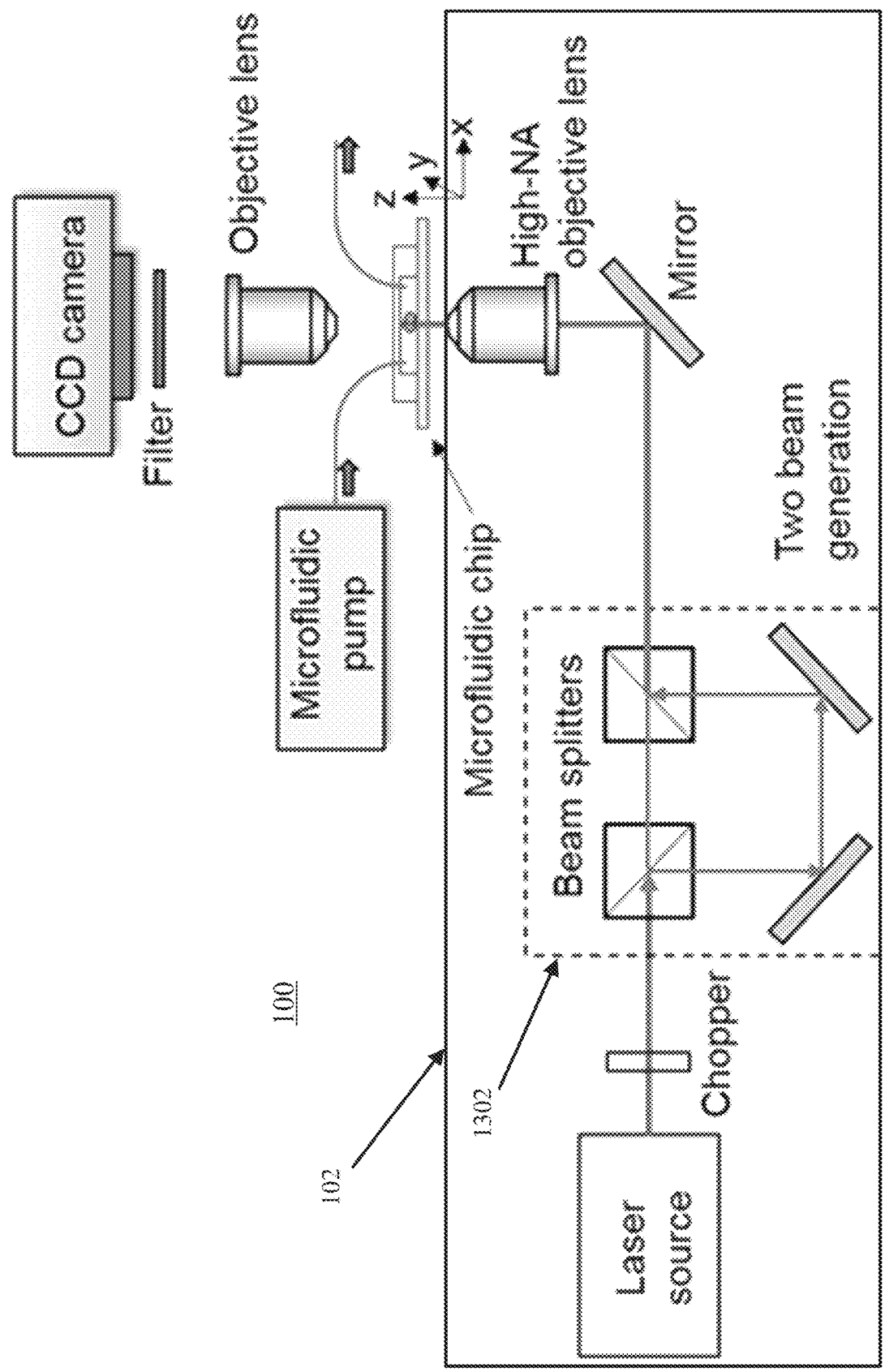
FIG. 13 shows an optofluidic system with an optical tweezer system that generates one-dimensional optical tweezer arrays in the microfluidic channel.

FIG. 13 shows an optofluidic system 100 with an optical tweezer system 102 that generates one-dimensional optical tweezer arrays in the microfluidic channel. As shown, the optical tweezer system 102 uses a single laser source and an interferometer system 1302 comprising two optical beam splitters and two mirrors to separate the input laser beam into two spatially overlapped, parallel propagating laser beams. The optical tweezer system 102 generates the one-dimensional optical tweezer arrays inside the microfluidic channel after the two laser beams are focused simultaneously using the same high-NA microscope objective lens and interference inside the microfluidic channel. Each optical tweezer in the one-dimensional optical tweezer array is formed in the region where there is constructive interference between the two beams. By controlling the phase difference and the spatial overlap between the two beams, the optical interference pattern can be fine-tuned. The processor may control the phase difference by varying the length difference between the two beams through adjusting the distance of the two mirrors to the two beam splitters. The spatial overlap between the two beams can be controlled by adjusting the angles of the two mirrors.

Figure 14:
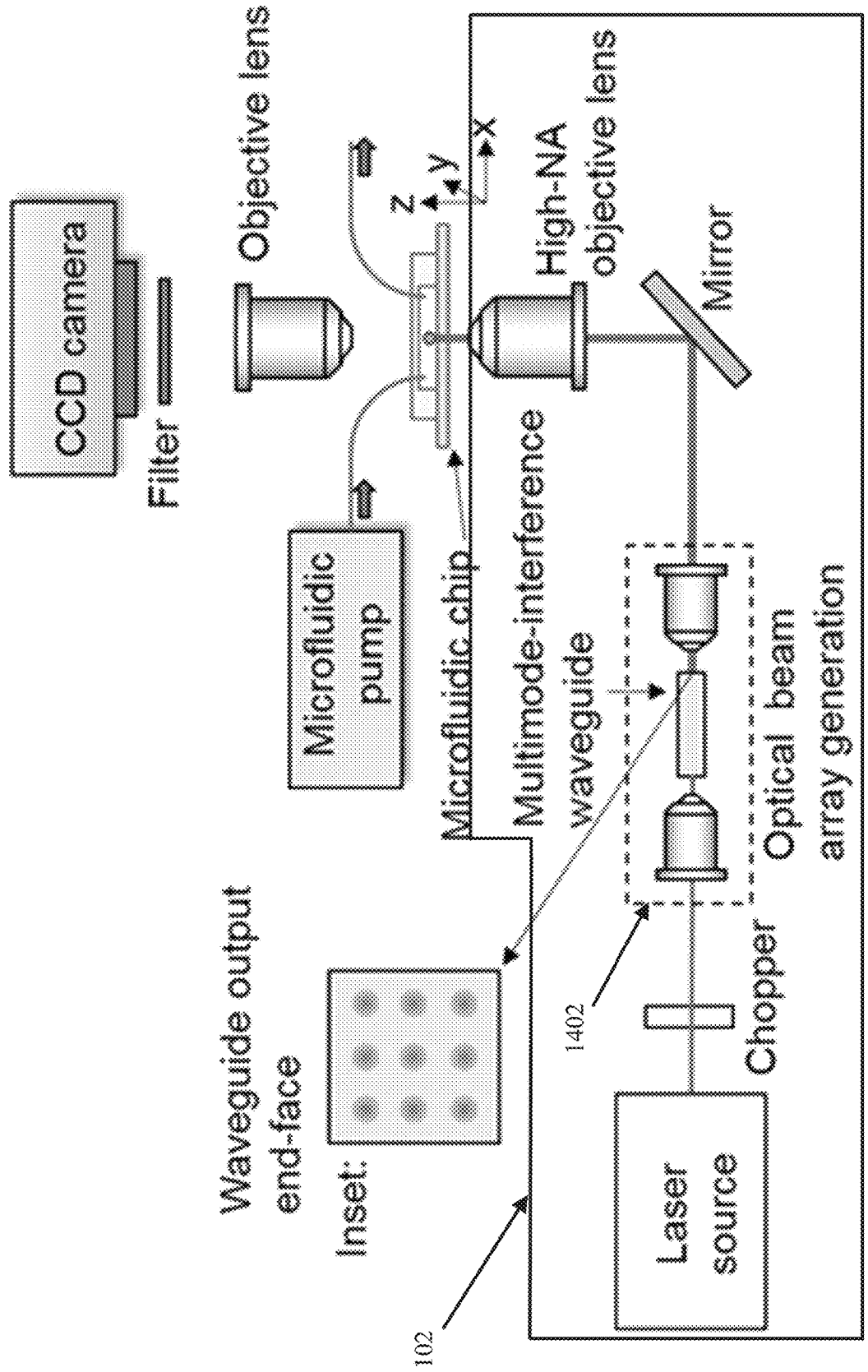
FIG. 14 shows another optofluidic system with an optical tweezer system that generates one-dimensional and/or two-dimensional optical tweezer arrays in the microfluidic channel.

FIG. 14 shows another optofluidic: system 100 with an optical tweezer system 102 that generates one-dimensional and/or two-dimensional optical tweezer arrays in the microfluidic channel. As shown, the optical tweezer system 102 uses a single laser source and a passive multimode-interference (MMI) waveguide 1402 to shape the input Gaussian beam into an output multiple optical beam array following the multimode interference inside the waveguide. Based on the self-imaging effect, multiple images of the input light field can be generated at the output of the MMI waveguide when the waveguide is appropriately designed in terms of the waveguide dimension and the refractive indices of the waveguide core and cladding. The optical tweezer system 102 may generate various optical lattices using the MMI waveguide 1402 by adopting different cross-sectional shapes and dimensions and lengths of the waveguide. The inset shows schematically a 3×3 optical lattice generated from the waveguide output end-face as an example. The microscope objective lenses are used for input and output coupling with the MMI waveguide 1402. By controlling the input coupling condition, the optical lattice pattern may be fine-tuned. The resulted optical lattice beams are focused by a high-NA microscope objective lens into the microfluidic channel to form the optical tweezer arrays.

Figure 15:
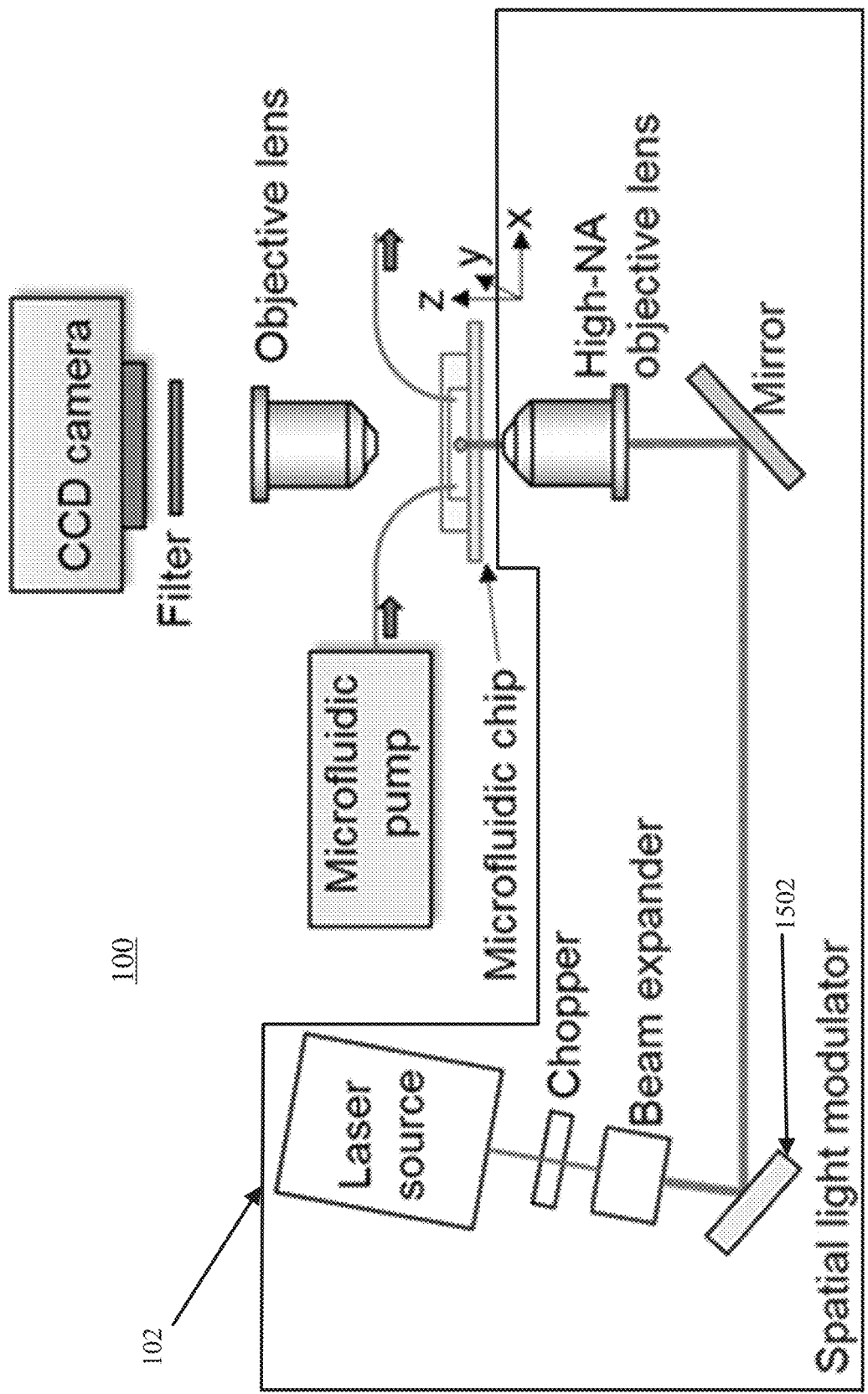
FIG. 15 shows another optofluidic system with an optical tweezer system that generates one-dimensional and two-dimensional optical tweezer arrays in the microfluidic channel.

FIG. 15 shows another optofluidic system 100 with an optical tweezer system 102 that generates one-dimensional or two-dimensional optical tweezer arrays in the microfluidic channel. As shown, the optical tweezer system 102 uses a single laser source and a computer-controlled spatial light modulator (SLM) 1502 to shape an expanded single optical beam into a lattice of optical tweezers (so-called holographic optical tweezers). The SLM is an array of electro-optic devices with individually tunable phase-sensitive elements, which can shape an incident laser beam with certain spatial-dependent intensity- and phase-modulations to generate complex optical patterns, such as lattice patterns. The lattice may be one- or two-dimensional and can be actively reconfigured. The optical beams are focused by a high-NA microscope objective lens into the microfluidic channel to form the optical tweezer arrays.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An optofluidic system for stretching a plurality of sample isolates, comprising:
    a microfluidic flow system comprising at least one microfluidic channel and a microfluidic pump;
    an optical tweezer system, wherein the optical tweezer system comprises:
    a laser source configured to generate an optical tweezer directed towards the at least one microfluidic channel; and
    a multimode-interference waveguide or a spatial light modulator configured to generate a 1-dimensional optical tweezer array or a 2-dimensional optical tweezer array using the generated optical tweezer;
    an image processing system configured to capture images of the plurality of sample isolates within the at least one microfluidic channel; and
    one or more processors configured to:
        trap, using the 1-dimensional optical tweezer array or the 2-dimensional optical tweezer array, the plurality of sample isolates away from a wall of the at least one microfluidic channel;
        generate, using the microfluidic pump of the microfluidic flow system, a microfluidic flow to stretch the plurality of trapped sample isolates;
        determine deformation characteristics of the plurality of stretched sample isolates based on one or more frames from the image processing system; and
        output information corresponding to the deformation characteristics.

2. The optofluidic system of claim 1, wherein the one or more processors are further configured to modulate the optical tweezer of the optical tweezer system by turning on the optical tweezer for a first period of time to trap the plurality of sample isolates and turning off the optical tweezer for a second period of time to release the plurality of trapped sample isolates.

3. The optofluidic system of claim 2, wherein the optical tweezer system comprises:
    a modulation device configured to modulate the optical tweezer.

4. The optofluidic system of claim 1, wherein the one or more processors are configured to enable continuous delivery of the plurality of sample isolates and continuous imaging of the plurality of sample isolates based on generating the microfluidic flow using the microfluidic pump and trapping the plurality of sample isolates using the optical tweezer system.

5. The optofluidic system of claim 1, wherein the laser source is configured to generate a highly focused laser beam with a Gaussian profile.

6. The optofluidic system of claim 1, wherein the optical tweezer system comprises:
    an interferometer system configured to split the optical tweezer into multiple optical tweezers directed towards the at least one microfluidic channel, and
    wherein the one or more processors are further configured to trap the plurality of sample isolates using the multiple optical tweezers from the interferometer system.

7. The optofluidic system of claim 1, wherein the optical tweezer system comprises a plurality of laser sources configured to generate multiple optical tweezers directed towards the at least one microfluidic channel, and
    wherein the one or more processors are further configured to trap the plurality of sample isolates using the multiple optical tweezers from the plurality of laser sources.

8. The optofluidic system of claim 1, wherein the optical tweezer system comprises:
    the multimode-interference waveguide, and
    wherein the one or more processors are configured to trap the plurality of sample isolates using the 1-dimensional optical tweezer array.

9. The optofluidic system of claim 1, wherein the optical tweezer system comprises:
    the multimode-interference waveguide, and
    wherein the one or more processors are configured to trap the plurality of sample isolates using the 2-dimensional optical tweezer array.

10. The optofluidic system of claim 1, wherein the optical tweezer system comprises:
    the spatial light modulator, and
    wherein the one or more processors are configured to trap the plurality of sample isolates using the 1-dimensional optical tweezer array.

11. The optofluidic system of claim 1, wherein the optical tweezer system comprises:
the spatial light modulator, and
wherein the one or more processors are configured to trap the plurality of sample isolates using the 2-dimensional optical tweezer array.

12. The optofluidic system of claim 1, wherein the one or more processors are configured to determine deformation characteristics of the plurality of stretched sample isolates based on comparing $d_x/d_y$ ratios of the plurality of sample isolates prior to and after stretching the plurality of sample isolates.

13. The optofluidic system of claim 1, wherein a cross-section of the microfluidic channel is larger than a sample isolate from the plurality of trapped sample isolates.

14. The optofluidic system of claim 1, further comprising:
a control system configured to control the microfluidic flow system, the optical tweezer system, and the image processing system, and
wherein the control system comprises the one or more processors.

15. The optofluidic system of claim 1, wherein the one or more processors comprises a first processor, a second processor, and a third processor,
wherein the optical tweezer system comprises the first processor, the microfluidic flow system comprises the second processor, and the image processing system comprises the third processor,
wherein the first processor is configured to trap the plurality of sample isolates, the second processor is configured to generate the microfluidic flow to stretch the plurality of trapped sample isolates, and the third processor is configured to determine the deformation characteristics and output the information corresponding to the deformation characteristics.

16. The optofluidic system of claim 1, wherein the one or more processors are configured to trap the plurality of sample isolates using the optical tweezer system by generating the optical tweezer using a wavelength that is within a spectral window of the optical tweezer system,
wherein the spectral window is:
a wavelength range that causes the optical tweezer to be transparent to the plurality of trapped sample isolates;
a wavelength range that causes the optical tweezer to be transparent to a medium of the at least one microfluidic channel;
a wavelength range that causes the optical tweezer to be transparent to a substrate of the at least one microfluidic channel; or
a wavelength range that causes the optical tweezer to be transparent to the wall of the at least one microfluidic channel.

17. The optofluidic system of claim 1, wherein the at least one microfluidic channel is formed using a patterned transparent material, wherein the patterned transparent material causes the wall or a substrate of the at least one microfluidic channel to be transparent when imaging the plurality of sample isolates using the image processing system.

18. A method for stretching a plurality of sample isolates, comprising:
trapping, using a 1-dimensional or 2-dimensional optical tweezer array associated with an optical tweezer, the plurality of sample isolates away from a wall of at least one microfluidic channel of a microfluidic flow system, wherein a multimode-interference waveguide or a spatial light modulator generates the 1-dimensional or the 2-dimensional optical tweezer array;
generating, using a microfluidic pump of the microfluidic flow system, a microfluidic flow to stretch the plurality of trapped sample isolates;
determining, by one or more processors, deformation characteristics of the plurality of stretched samples isolates based on one or more frames from an image processing system; and
outputting, by the one or more processors, information corresponding to the deformation characteristics.

19. The method of claim 18,
further comprising:
modulating the optical tweezer by turning on the optical tweezer for a first period of time to trap the plurality of sample isolates and turning off the optical tweezer for a second period of time to release the plurality of trapped sample isolates.

20. A non-transitory computer-readable storage medium comprising computer-executable instructions that, when executed by one or more processors of an optofluidic system, causes the optofluidic system to:
trap, using a 1-dimensional or 2-dimensional optical tweezer array associated with an optical tweezer, the plurality of sample isolates away from a wall of at least one microfluidic channel of a microfluidic flow system, wherein a multimode-interference waveguide or a spatial light modulator generates the 1-dimensional or the 2-dimensional optical tweezer array;
generate, using a microfluidic pump of the microfluidic flow system, a microfluidic flow to stretch the plurality of trapped sample isolates;
determine deformation characteristics of the plurality of stretched samples isolates based on one or more frames from an image processing system; and
output information corresponding to the deformation characteristics.

* * * * *